(12) United States Patent
Girard

(10) Patent No.: US 9,253,015 B2
(45) Date of Patent: Feb. 2, 2016

(54) TRANSPARENT PROXY ARCHITECTURE FOR MULTI-PATH DATA CONNECTIONS

(75) Inventor: Nicolas Girard, Boston, MA (US)

(73) Assignee: Attila Technologies, LLC, Franklin Lakes, NJ (US)

( * ) Notice: Subject to any disclaimer, the term of this patent is extended or adjusted under 35 U.S.C. 154(b) by 220 days.

(21) Appl. No.: 13/807,740

(22) PCT Filed: Jul. 8, 2011

(86) PCT No.: PCT/US2011/043461
§ 371 (c)(1),
(2), (4) Date: Dec. 30, 2012

(87) PCT Pub. No.: WO2012/006595
PCT Pub. Date: Jan. 12, 2012

(65) Prior Publication Data
US 2013/0111038 A1 May 2, 2013

Related U.S. Application Data

(60) Provisional application No. 61/362,764, filed on Jul. 9, 2010.

(51) Int. Cl.
*G06F 15/173* (2006.01)
*H04L 29/08* (2006.01)
(Continued)

(52) U.S. Cl.
CPC .......... *H04L 29/0818* (2013.01); *H04L 45/245* (2013.01); *H04L 47/2475* (2013.01);
(Continued)

(58) Field of Classification Search
CPC .................................................. H04L 29/0818
USPC .......................................................... 709/226
See application file for complete search history.

(56) References Cited

U.S. PATENT DOCUMENTS

| 7,551,563 B2 * | 6/2009 | Beadle et al. ................. 370/238 |
| 2002/0085587 A1 | 7/2002 | Mascolo |

(Continued)

OTHER PUBLICATIONS

Hsieh et al. ("A transport layer approach for achieving aggregate bandwidth on multi-homed mobile hosts", ACM Mobicom '02, Sep. 2012.*

(Continued)

*Primary Examiner* — Chris Parry
*Assistant Examiner* — Weiwei Stiltner
(74) *Attorney, Agent, or Firm* — Otterstedt, Ellenbogen & Kammer, LLP

(57) ABSTRACT

A method for forming an optimized communication connection providing enhanced performance of at least one application utilizing the communication connection is provided, the communication connection including a plurality of individual communication networks. The method includes the steps of: obtaining a set of performance requirements corresponding to the application utilizing the communication connection; obtaining real-time capacity information for each of a plurality of available channels associated with the respective individual communication networks; applying at least one policy-based management criteria to the available channels for controlling, in real-time, one or more aspects of the available channels; dynamically aggregating the individual communication networks to form the optimized communication connection, the communication connection leveraging one or more features and capabilities of at least a subset of the communication networks; and controlling real-time traffic scheduling across at least a subset of the available channels so as to adapt the communication connection to changes in network conditions and/or policy-based management criteria.

33 Claims, 9 Drawing Sheets

(51) Int. Cl.
  *H04L 12/709* (2013.01)
  *H04L 12/859* (2013.01)
  *H04L 12/923* (2013.01)
  *H04L 12/915* (2013.01)
  *H04W 80/06* (2009.01)
  *H04L 12/26* (2006.01)
  *H04W 48/16* (2009.01)
  *H04W 72/12* (2009.01)
  *H04W 76/02* (2009.01)
  *H04W 88/18* (2009.01)

(52) U.S. Cl.
  CPC ............ *H04L 47/762* (2013.01); *H04L 47/785* (2013.01); *H04W 80/06* (2013.01); *H04L 43/0852* (2013.01); *H04L 43/0888* (2013.01); *H04W 48/16* (2013.01); *H04W 72/12* (2013.01); *H04W 76/02* (2013.01); *H04W 88/182* (2013.01)

(56) References Cited

U.S. PATENT DOCUMENTS

| | | |
|---|---|---|
| 2002/0141393 A1 | 10/2002 | Eriksson et al. |
| 2003/0058886 A1* | 3/2003 | Stanforth et al. ............. 370/468 |
| 2005/0185579 A1 | 8/2005 | Jung |
| 2006/0041681 A1* | 2/2006 | Rumelhart ............. H04L 45/30 709/238 |
| 2006/0104231 A1 | 5/2006 | Gidwani |
| 2006/0146729 A1 | 7/2006 | Krautkremer et al. |
| 2006/0193295 A1 | 8/2006 | White et al. |
| 2009/0010190 A1* | 1/2009 | Gong ..................... H04L 45/26 370/311 |
| 2010/0103915 A1* | 4/2010 | Ho et al. ........................ 370/338 |
| 2010/0115048 A1* | 5/2010 | Scahill ......................... 709/213 |
| 2010/0121972 A1* | 5/2010 | Samuels et al. ............... 709/231 |
| 2010/0275085 A1* | 10/2010 | Venkatachalam et al. .... 714/748 |
| 2010/0278101 A1* | 11/2010 | Bengtsson ........ H04L 29/12471 370/328 |
| 2010/0278158 A1* | 11/2010 | Lee et al. ....................... 370/338 |
| 2011/0131319 A1* | 6/2011 | Harrang et al. ............... 709/224 |
| 2011/0229126 A1* | 9/2011 | Gerstel ............................ 398/25 |
| 2014/0052823 A1* | 2/2014 | Gavade ............. H04N 21/2541 709/219 |

OTHER PUBLICATIONS

Search Report and Written Opinion of the International Searching Authority for Application No. PCT/US11/43461, Dec. 2011.

\* cited by examiner

300

400

600

650

700

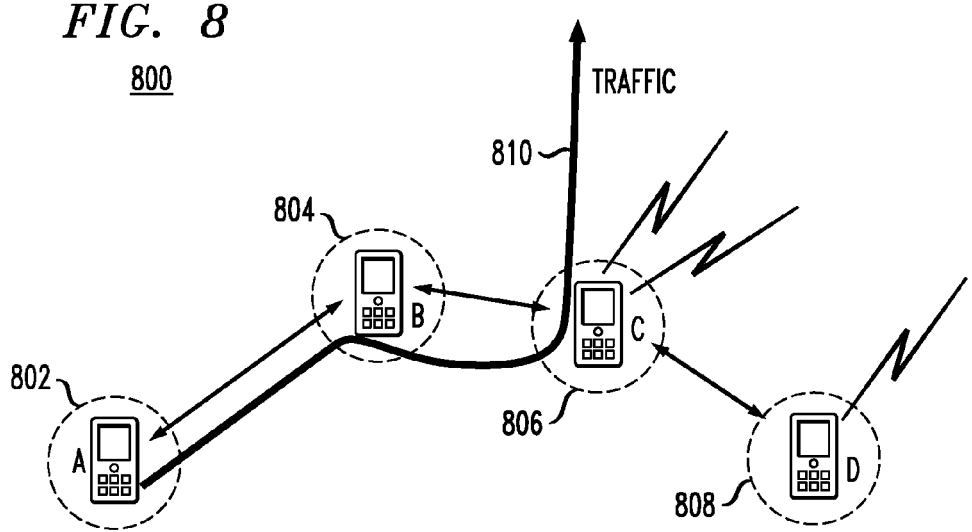
FIG. 8
800
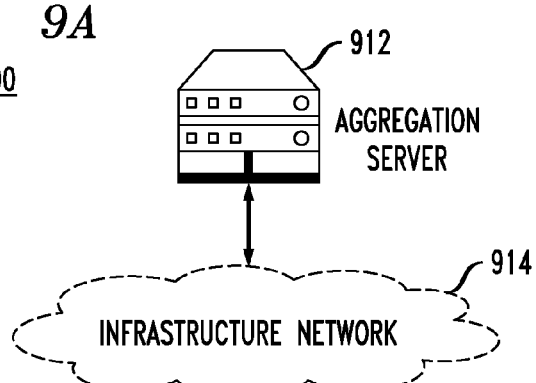
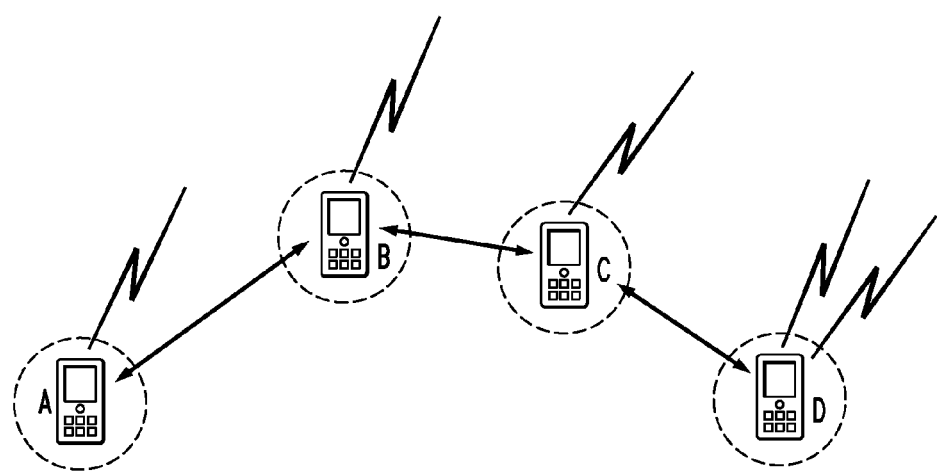
FIG. 9A
900

950

- ▨ REMOTE CONNECTIONS USED BY A
- ● RELOCATED CONNECTIONS ENDPOINT AFTER LINK FAILURE

TRANSPARENT PROXY ARCHITECTURE FOR MULTI-PATH DATA CONNECTIONS

CROSS-REFERENCE TO RELATED APPLICATION(S)

This application claims the benefit of U.S. Provisional Application No. 61/362,764 filed on Jul. 9, 2010, the disclosure of which is incorporated herein by reference in its entirety.

FIELD OF THE INVENTION

The present invention relates generally to the electrical, electronic, and computer arts, and more particularly relates to electronic device communications.

BACKGROUND OF THE INVENTION

The Internet provides a platform for rapid and timely information exchange among a disparate array of clients and servers. Transmission control protocol (TCP) and Internet protocol (IP) are well-known separately designed and closely tied protocols that define rules of communication between end hosts, and are presently the most commonly used protocol suite for transferring data via the Internet. The combination of TCP/IP dominates modern communications over various networks, from a wired backbone to a heterogeneous network, due primarily to its simplicity and reliability. TCP has become the de facto standard used in most applications ranging from interactive sessions, such as, for example, hypertext transfer protocol (HTTP), to bulk data transfer, such as, for example, file transfer protocol (FTP). User Datagram Protocol (UDP) is used by many other applications, particularly Internet applications, requiring timely delivery of data. However, due at least in part to the lack of implicit acknowledgments, UDP cannot guarantee reliability, ordering or integrity of the data. Most multimedia streaming applications, as well as Voice over IP (VoIP), use the UDP protocol.

TCP was originally designed primarily for wired networks. In a wired network, random bit error rate (BER), a characteristic usually more pronounced in a wireless network environment, is negligible, and congestion is a main cause of packet loss. Emerging wireless applications, especially high-speed multimedia services and the advent of wireless IP communications carried by the Internet, call for calibration and sophisticated enhancement or modifications of this protocol suite for improved performance.

Based on the assumption that packet losses are indicative of network congestion, an additive increase/multiplicative decrease (AIMD) algorithm, which is a feedback control mechanism used in TCP congestion avoidance, reaches a steady state which reflects the protocol's efficiency in terms of throughput and link utilization. However, this assumption does not necessarily hold true when the end-to-end path also includes wireless links. Factors including, for example, high BER, unstable channel characteristics, and user mobility, may all contribute to packet losses.

Many studies have shown that an unmodified standard TCP performs poorly in a wireless communications environment due, at least in part, to its inability to distinguish packet losses caused by network congestion from those losses attributed to transmission errors. This phenomenon gets exacerbated for very lossy wireless connections such as, for example, satellite. Numerous modifications to TCP have been proposed to resolve, or at least alleviate, some of the issues with its original design. Unfortunately, however, conventional methodologies for addressing these issues have been, thus far, ineffective.

To be effective, modifications to TCP should to be applied on both ends of the communications (e.g., on the client side and on the server side). In practice, however, it is very rare to control both endpoints. As such, the concept of Performance Enhancing Proxies (PEPs) has been introduced. PEPs are introduced on both ends of a particular wireless connection and implement numerous alterations to TCP to improve the performance over a wireless segment, without requiring modifications to the client applications or servers. However, PEPs have at least two major limitations: first, they can only optimize one wireless connection at a time; and second, they break the end-to-end semantics of ingress and egress TCP connections. UDP complements TCP in terms of reliability. However, UDP does not detect congestion in the networks, nor does it retransmit lost packets. As a consequence, UDP performance is further degraded compared to TCP when used with lossy wireless networks. Furthermore, PEPs fail to optimize UDP because, unlike TCP, UDP does not establish a connection before sending application datagrams. Consequently, conventional means of addressing such wireless data communications problems have been insufficient.

SUMMARY OF THE INVENTION

Principles of the invention, in illustrative embodiments thereof, advantageously provide a system for forming an optimal communication connection to support the needs of advanced real-time mobile applications. Unique capabilities of the system include, but are not limited to, an ability to dynamically leverage and aggregate individual capabilities of all available networks simultaneously so as to form an ideal "communications pipe" (e.g., an enhanced data connection aggregating one or more capabilities of respective individual access networks forming the communications pipe), thus capitalizing on performance differences (e.g., superior bandwidth, low interference, latency, congestion, etc.) of each access network. The exemplary system is preferably fully programmable and flexible enough to support diverse goals, whether to maximize the performance of mobile applications or to provide stealth communications capabilities. Such benefits of embodiments of the invention may be achieved, for example, by tightly coupling active application profiling and inspection, policy management, multi-network scheduling, network detection and monitoring, among other methodologies.

The enhanced data connection, according to one illustrative embodiment of the invention, is preferably constructed of a dynamic aggregation of multiple data connections initiated on the device. A multi-homed concurrent data transfer is preferably provided by a multi-network transport protocol (MNTP). The system beneficially provides a uniform and resilient network interface to unmodified software applications without disrupting underlying access networks.

In accordance with one embodiment of the invention, a method for forming an optimized communication connection providing enhanced performance of at least one application utilizing the communication connection is provided, the communication connection including a plurality of individual communication networks. The method includes the steps of: obtaining a set of performance requirements corresponding to the application utilizing the communication connection; obtaining real-time capacity information for each of a plurality of available channels associated with the respective individual communication networks; applying at least one policy-based management criteria to the available channels for controlling, in real-time, one or more aspects of the available channels; dynamically aggregating the individual communication networks to form the optimized communication connection, the communication connection leveraging one or more features and capabilities of at least a subset of the communication networks; and controlling real-time traffic scheduling across at least a subset of the available channels so as to adapt the communication connection to changes in network conditions and/or policy-based management criteria.

In accordance with another embodiment of the invention, a method for implementing a transparent concurrent multiple-network communication which maintains end-to-end Internet protocol (IP) semantics and compatibility is provided. The method includes the steps of: providing a proxy architecture between a client device and a corresponding server device utilizing the multiple-network communication; intercepting, by the proxy architecture, communications between the client device and the server device to obtain information relating to an interaction between the client and server devices in a manner which is transparent to the client and server devices; and controlling the interaction between the client and server devices by the proxy architecture as a function of the obtained information relating to the interaction between the client and server devices.

In accordance with yet another aspect of the invention, a method for performing managed data offloading using multiple access networks includes the steps of: provisioning a client device to establish simultaneous connectivity with the client device using at least two channels in the multiple access networks, such that data from a first one of the channels is offloaded to a second one of the channels in real-time without disruption of service; adding a layer of signaling between the client device and at least one server device in communication with the client device; dynamically aggregating at least a subset of available access networks as a function of decision-making criteria controlled jointly by a transaction between the client and server devices; and controlling offloading of at least a portion of data as a function of one or more characteristics of the available access networks.

A system according to aspects of the invention is provided for performing managed data offloading using multiple access networks. In an illustrative embodiment thereof, a client device (e.g., smartphone, etc.) equipped with multiple radio access technologies is advantageously provisioned for performing managed data offloading as a background service and attached to a corresponding server gateway deployed in a service provider's network. By adding a layer of signaling between clients and their corresponding server(s), decision-making may be performed by a joint client/server transaction, thereby allowing network-controlled management of available resources as a function of real-time analytics reporting.

In accordance with still another aspect of the invention, an apparatus for multiplexing a plurality of individual network connections to form an enhanced communication connection providing at least one of increased bandwidth, security, reliability and efficiency in a hybrid peer-to-peer network is provided. The apparatus includes memory and at least one processor connected with the memory and operative: to discover and maintain multiple-network connectivity for at least a subset of a plurality of respective peers forming a peer-to-peer ad hoc network; to leverage a plurality of individual multiple access networks connected with one or more of the plurality of peers and aggregate the plurality of multiple access networks into a logical connection; and to implement out-of-band signaling operative to support communication and control of the peer-to-peer ad hoc network.

In one illustrative embodiment, a system includes a self-adapting mechanism for robust and assisted mobile peer-to-peer networks. The system ideally addresses challenges in traditional peer-to-peer networks, such as, for example, the lack of centralized control and monitoring, without limiting the functionality and/or advantages of such networks. In a second illustrative embodiment, the system comprises a multiplexing scheme for hybrid peer-to-peer networks which preferably provides data path aggregation in mobile peer-to-peer networks. In this embodiment, nodes in the system can preferably communicate directly with one another over the mobile peer-to-peer and with external infrastructure networks.

A multi-path transport protocol according to aspects of the invention is capable of distributing (e.g., transmitting and receiving) multiple streams of data simultaneously over concurrent data paths (e.g., aggregation) between two or more multi-homed endpoints having an established network connection. Features of the multi-path transport protocol (e.g., MNTP) include, but are not limited to, multi-path concurrent transmission, active and passive link performance probing and estimation (e.g., passive and active bandwidth and latency estimation), polymorphic scheduling support, out-of-order mitigation, configurable payload expiration support, differentiated and granular application stream management, Robust Header Compression (ROHC) support, and per-link wireless optimization.

A system according to aspects of the invention utilizes multiple cognitive radios to access open, unlicensed frequency bands. The radios hop on different wireless channels and connect to different networks. One advantage of this system is to freely access available spectrum to increase performance and reliability of the wireless network. As a direct application of this invention, upper layer applications running on the system are oblivious to network changes caused by the radios switching frequencies. In this embodiment, the system beneficially enables applications to run undisrupted data sessions on cognitive radio networks.

A system according to other aspects of the invention utilizes a node as a rendezvous point, e.g. peers across multiple networks exchanging resource and information through a multi-homed node. When the multi-homed node is connected to multiple networks, other nodes from one network to which the multi-homed node is connected can access other networks to which the multi-homed node is also connected. In this embodiment, the multi-homed node can work as a proxy or bridge among different networks.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein:

FIG. 8 illustrates an exemplary four-node hybrid peer-to-peer network, according to an embodiment of the invention;

FIGS. 9A and 9B illustrate an exemplary connection aggregation methodology in a hybrid peer-to-peer network, according to an embodiment of the invention;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present invention will be described herein in the context of illustrative embodiments of a transparent proxy architecture (TPA) for multi-link data connections that aim at optimizing the performance of any application(s) over multiple wired or wireless data connections. The TPA replaces the legacy TCP protocol or any optimized TCP implementations with a transport protocol capable of taking advantage of a plurality of possible data connections between the proxy endpoints, while being fully transparent to legacy applications. One or multiple network connections are available between each multi-homed TPA endpoint. Among other advantages, the TPA according to embodiments of the invention seeks: to optimize the performance of each of the communication paths between the multi-homed endpoints; to take advantage of the multiple paths between endpoints to improve performance; to be transparent to applications routing traffic through TPA; and to modify applications between each TPA endpoint to further optimize performance.

It is to be appreciated that the invention is not limited to the specific apparatus and methods illustratively shown and described herein. For example, while aspects of the invention may be described in the context of a standard TCP/IP protocol, the invention is not limited to such a protocol. Rather, principles of the invention may be extended to essentially any data communications protocol (standard or non-standard), both wired and wireless.

Aspects of the present invention will be described in further detail in sections I through IV below.

Figure 1:
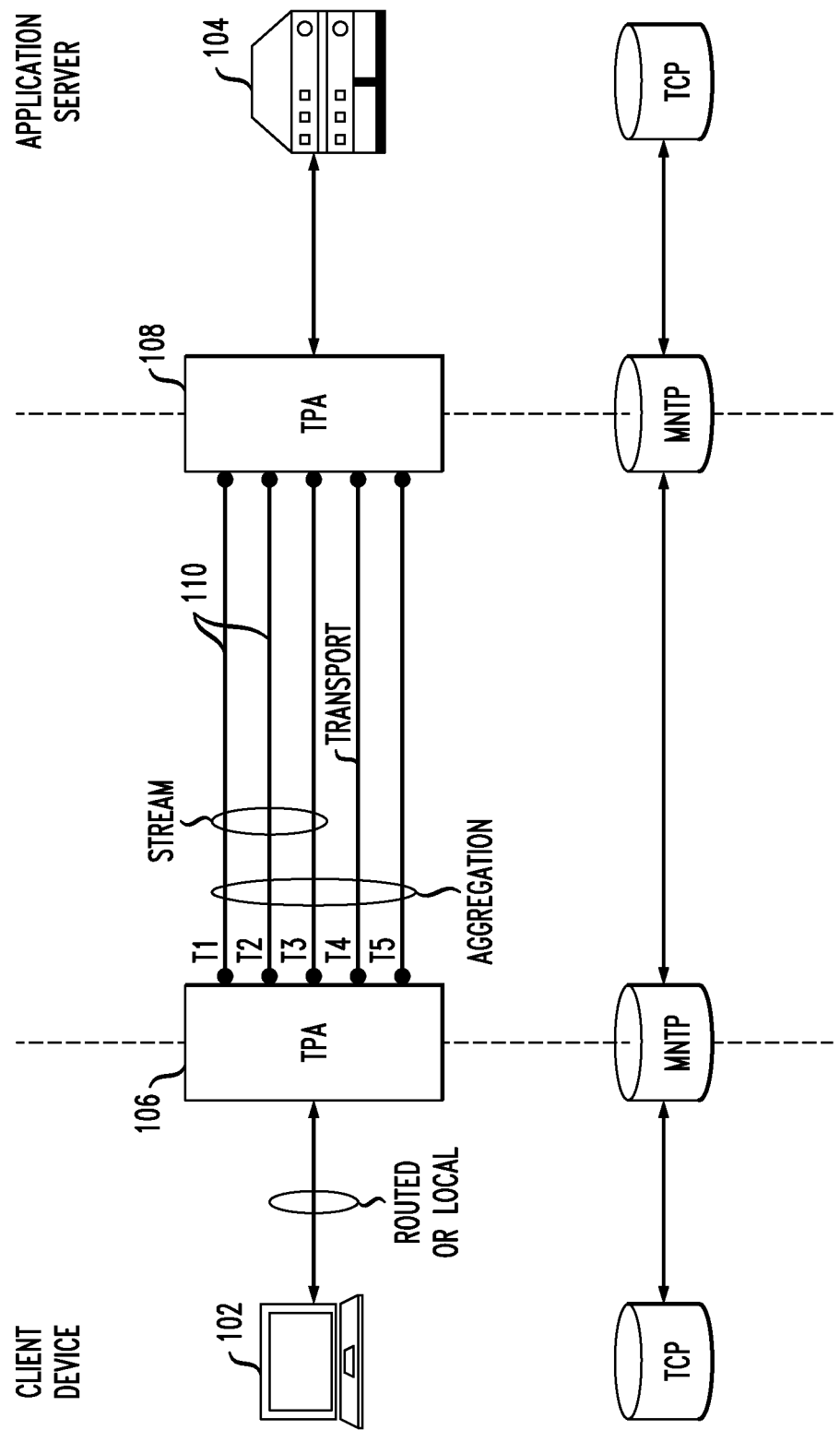
FIG. 1 illustrates at least a portion of an exemplary transparent proxy architecture (TPA), according to an embodiment of the present invention.

I. TPA for Multi-path Data Connections Between Multi-homed Hosts to Significantly Enhance the Performance of Applications Over Heterogeneous Wireless Connections FIG. 1 illustrates at least a portion of an exemplary TPA system 100, according to an embodiment of the present invention. As apparent from the figure, TPA system 100 preferably includes a client device 102, which maybe a personal computer (PC), mobile device, etc., in operative communication with an application server 104, or alternative framework for efficiently executing procedures (e.g., programs, routines, scripts, etc.) for supporting the construction of applications. Application server 104 may be hardware-based, such as a dedicated processor, or it may be software-based, such as program code running on a general purpose or dedicated processor and operative to perform prescribed functions.

Client device 102 is connected to a first gateway 106, or alternative routing device, and application server 104 is connected to a second gateway 108, or alternative routing device. The first and second gateways are preferably operative to implement a TPA and are in communication with one another via one or more data transport channels 110. A plurality of transport channels 110 (e.g., T1, T2 and T3) may be referred to herein collectively as a stream, and a plurality of transport streams may be referred to herein collectively as an aggregation. The bandwidth of an aggregation is a function of the respective bandwidths of the individual channels or streams in the aggregation. First and second gateways 106, 108 are preferably operative to control data traffic over the transport channels 110. Connections, or portions thereof, between the client device 102 and first gateway 106, between the application server 104 and second gateway 108, and between the first and second gateways, may be wired or wireless, as will be known by those skilled in the art given the teachings herein.

In the TPA system 100, client- or server-initiated connections are preferably intercepted on a host or at a routing gateway in a transparent fashion; the content of the connections is carried over to a receiving end (the application server/client or a routing gateway on the routing path to the application server/client) using, for example, a concurrent multi-link transport protocol (replacing TCP and user datagram protocol (UDP), in whole or in part), or an alternative communication means. A good fit for this replacement transport protocol is MNTP, which is operative to perform per-connection optimizations (or alternative functions) based, at least in part, on the nature of each of the wireless connections, in real time.

TPA does not add any significant latency compared to a direct connection between the client and the server; nor does it require modifications to the applications. More importantly, TPA maintains the end-to-end semantics of TCP, which a number of sophisticated protocols, such as, for example, Internet Protocol Security (IPSec), rely on. The transparent nature of the TPA refers to the applications initiating the connections being essentially unaware that the connections are being intercepted (also known spoofing or hijacking), thus ensuring full compatibility with legacy applications. Other proxy architectures, such as, for example, SOCKS (which operates at Layer 5 of the Open Systems Interconnection (OSI) model), implement explicit interception and require communication between the host application and the proxy intercepting the connections, explicitly requesting the proxy to perform certain actions on behalf of the host.

The interception can be performed on the host directly or on a gateway or router on the routing path to the destination. Each approach presents a number of benefits and drawbacks. More particularly, implementing the transparent interception on the host eliminates the need for an additional device to be deployed in the network (which may not be owned or operated by the same entity owning or operating the sending host), but the interception is limited to the connections initiated or received by the host. Alternatively, implementing the interception on the routing gateway allows multiple hosts to benefit from the system, but can create additional complications in the implementation of the interception.

Embodiments of the invention present several techniques for intercepting TCP, UDP and/or Internet Control Message Protocol (ICMP) connections. Some of these illustrative techniques will be presented in further detail below. It is to be appreciated that the techniques described herein are merely exemplary and are not intended to be limiting in any way regarding the scope of the present invention, as will become apparent to those skilled in the art.

Socket Overloading

When an application opens a regular TCP or UDP socket, the socket call on the operating system is transparently mapped to the socket for the replacement multi-link transport protocol implemented by the proxy between endpoints.

TCP/UDP Splitter

When an application makes one or more socket calls, these calls are either intercepted within the network stack of an operating system and either redirected to a local process that accepts the connection and forwards the traffic to the endpoint over the multi-link network protocol, or redirected within the network stack itself Transparent SOCKS Redirector When an application makes one or more socket calls, these calls are intercepted within the network stack of an operating system and mapped to corresponding SOCKS requests that are then funneled to a SOCKS proxy server. The SOCKS proxy server, in turn, processes the requests and performs the interception and routing of the intercepted traffic to the endpoint over the multi-link network protocol.

Virtual Interface

A "virtual interface," as the term is used herein, is intended to refer broadly to a network interface that is supported entirely in software, which is different from ordinary network interfaces that are backed up by hardware network adapters. A virtual interface can create a new interface to the operating system or masquerade one or multiple virtual interfaces backed up by hardware network adapters (e.g., regular network interfaces). Connections sent by the operating system via a virtual interface are preferably delivered to a user space program that attaches itself to the virtual interface, which then performs the interception and routing of the traffic to the endpoint over the multi-link network protocol.

Each technique for intercepting TCP connections presents different advantages and may be combined with one another or with other suitable techniques depending upon the application, as may become apparent to those skilled in the art given the teachings herein. For example, for implementation of the system on a local host, the socket overloading technique may be preferred, as it does not require a separate local program to perform the interception and is more efficient compared to other approaches. Furthermore, socket calls are usually implemented at the kernel level in most operating systems, thereby ensuring efficient use of resources. For implementation of the system on a gateway host, the splitter technique may be preferred, as it can be achieved without a significant latency penalty. For intercepting traffic that relies directly on the IP protocol (e.g., that is not using a session or transport protocol—ICMP is a good example of such a protocol), the virtual interface may be a preferred technique. Virtual interface is also a preferred technique for applications such as virtual private networks (VPNs) that may require binding to a specific network interface. A SOCKS redirector technique may be preferred for applications with explicit SOCK support and specific security requirements.

Additional techniques for intercepting TCP connections are described in further detail below, without loss of generality and without limitation.

Transparent Proxy Protocol (TPP)

Another major departure from traditional PEPs is the implementation of a control channel for communicating feedback information and/or commands, among other information, between endpoints. TPP is preferably the protocol employed between endpoints. TPP implements atomic commands, feedback and monitoring actions that get executed on an endpoint. Non-limiting examples of such actions include the following:

- Open or close a remote socket
- Open a TCP or UDP socket and optionally bind to it
- Connect a socket to an address of a hostname
- Listen to a socket and expect a connection from a remote peer
- Request a TCP or UDP port forward
- Get/Set quality of service (QoS) requirements
- Get/Set status requests
- Get/Set profile information
- Send/Request security information, usage information, etc . . .
- Get/Set performance metrics for a specific network interface
- Buffer/cache/release requests specific type of traffic with a certain size for a specific endpoint
- Socket migration negotiation commands
- Reflection mode synchronization To minimize the overhead of implementing a complete control channel on top of a transport protocol, a preferred implementation assumes that this information is incorporated into a header section, or alternative portion, of the protocol used to carry payload data (e.g., piggybacking onto the data traffic being exchanged by applications). For instance, if the MNTP protocol is used between TPA endpoints, a reserved section of the MNTP header should be used.

TPA preferably implements a number of processing modules at each endpoint to optimize operations. Those processing modules are preferably enabled and supported by the TPP protocol.

End-to-end TCP Semantics Preservation

This technique for intercepting TCP connections preserves the TCP's end-to-end reliability and correctness semantics. The loss of end-to-end semantics may cause problems to applications that rely on such a guarantee provided by TCP.

Header Stripping

Instead of encapsulating ingress or egress TCP/UDP frames coming from an application being intercepted by the TPA, TCP and UDP headers are stripped, thereby saving between about 20 and 60 bytes per IP packet for TCP, by way of example. In order to preserve end-to-end semantics, the proxy preferably uses TPP to inform the receiving end so that the headers can be regenerated at the other (receiving) end. Header stripping, in and of itself, can significantly improve performance while retaining the end-to-end service model assumed by the applications.

Deep Packet Inspection (DPI) and Stateful Inspection

For QoS assignment, stateful connection interception and other useful optimization information passed to the multi-link transport protocol, TPA preferably includes at least two inspection modules. Stateful inspection (e.g., stateful packet inspection (SPI)) essentially only performs protocol header inspection and is generally faster and less resource-intensive than DPI. However, stateful inspection is generally more limited in scope. At a minimum, TPA preferably performs stateful inspection, stripping the header on one TPA endpoint and regenerating it on the other endpoint. In TPA, DPI may be performed on the packet payload to determine what the application is (and thus derives its requirements in terms of QoS, throughput, latency, etc.), to intercept performance feedback used ultimately by the applications to adjust their behavior and used by the TPA to further optimize the connection between TPA endpoints, and to assist another TPA module (e.g., a protocol helpers module) in setting up the negotiation of connections and their corresponding interceptions.

TPA preferably implements DPI at line speed (e.g., it does not hold packets until the DPI function is successfully executed). Rather, TPA preferably copies and holds packets in circular buffers, or alternative non-destructive storage, that are then fed to the DPI module for further processing. This approach is a tradeoff between memory usage and connection latency.

Protocol Helpers

For stateless protocols, such as, for example, HTTP, the TPA advantageously does not disrupt the flow of connections and the addressing is replaced accordingly by both endpoints. However, some more sophisticated and stateful protocols (e.g., H.323, a standard promulgated by the International Telecommunications Union (ITU) Telecommunication Standardization Sector (ITU-T), or real-time streaming protocol (RTSP), a network control protocol designed for use in entertainment and communications systems to control streaming media servers) require exchanging a series of signals and setting up multiple TCP and UDP connections between endpoints.

Since TCP and UDP connections are intercepted by TPA, it is essentially not possible for an endpoint to know where to direct such connections without the support of the other endpoint. The situation can be further complicated by the presence of NAT (Network Address Translation) and/or PAT (Port Address Translation) on the routing path. For a client application and an application server to properly negotiate sessions and TCP/UDP connections through a proxy architecture, they generally require the support of the intercepting proxy to assist. The set of actions to be performed is generally protocol specific, hence the need for protocol-specific helpers.

Protocol helpers are TPA modules that are dynamically activated when a connection implementing a stateful protocol is intercepted. For example, protocol helpers may use the TPP protocol to communicate expected actions and commands initiated by one endpoint to another endpoint. Another illustrative use of protocol helpers is to intercept performance information sent over a feedback channel between a client application and a server application. For instance, the RTSP reports performance between the client and the server in order to adjust the transmission rate and encoding of video and audio data. That performance information collected by the RTSP protocol helper may, in turn, be used to further optimize the communication of the multi-link transport protocol between TPA endpoints.

Figure 2:
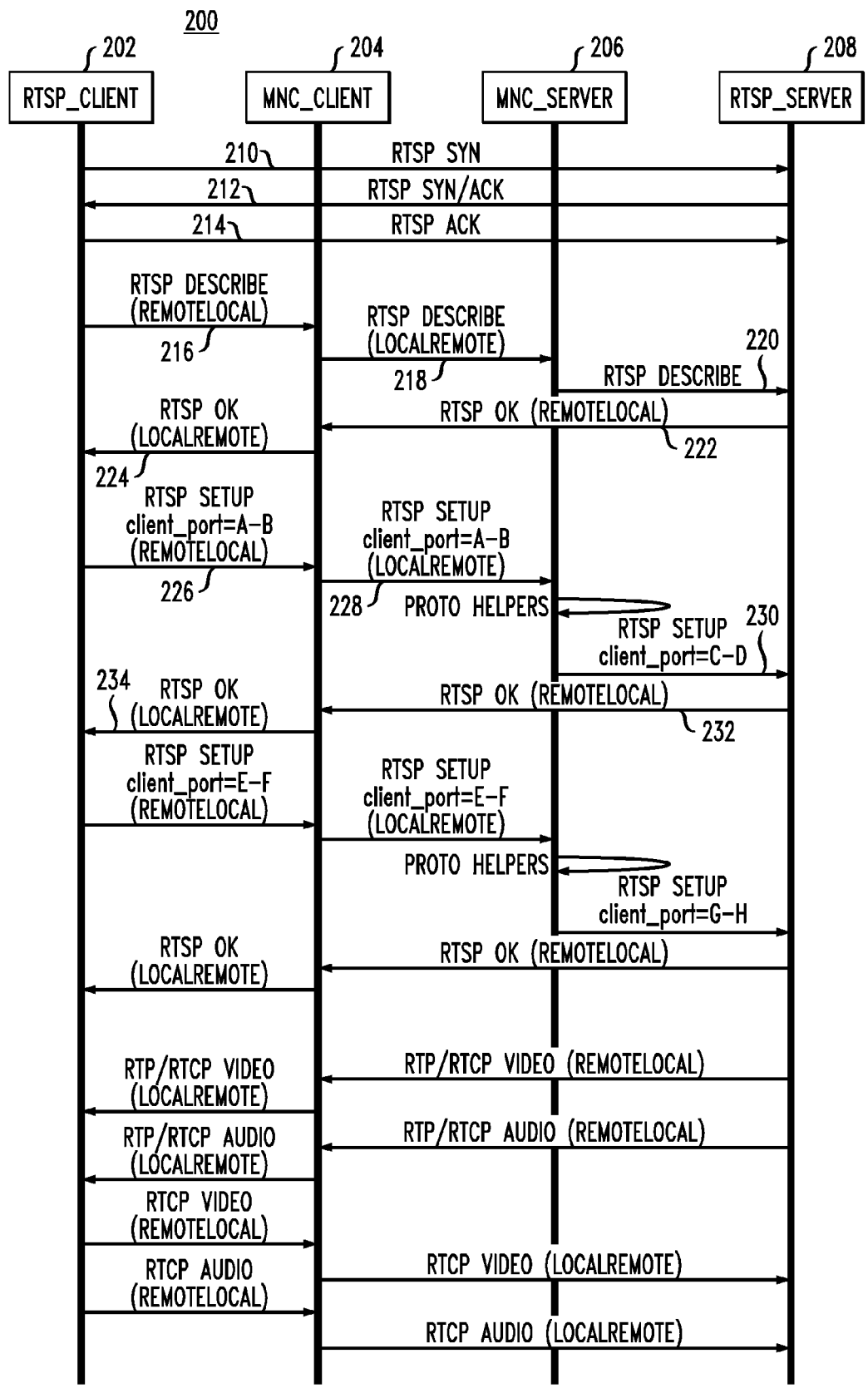
FIG. 2 is a state diagram depicting exemplary protocol-specific helpers support for a real-time streaming protocol (RTSP), according to an embodiment of the invention.

By way of example only and without loss of generality, FIG. 2 is a state diagram 200 depicting at least a portion of exemplary protocol-specific helpers support for an illustrative RTSP protocol, according to an embodiment of the invention. While similar in some ways to HTTP, RTSP generally defines control sequences useful in controlling multimedia playback, among other applications. Unlike HTTP, which is stateless, RTSP has state; an identifier is used when needed to track concurrent sessions. Like HTTP, RTSP uses TCP to maintain an end-to-end connection and, while most RTSP control messages are sent by the client to the server, some commands travel from server to client.

As apparent from FIG. 2, illustrative communications between an RTSP client 202, a multi-network communicator (MNC) client 204, an MNC server 206 and an RTSP server 208 are depicted. Modifications to the standard RTSP protocol according to an embodiment of the invention essentially enable a local MNC client 204 and MNC server 206 to function together for brokering at least one connection between the RTSP client 202 and RTSP server 208. To accomplish this, aspects of the invention are operative to essentially intercept signaling traffic between the RTSP client and the RTSP server for performing port replacement, among other operations.

With reference to FIG. 2, as an illustration only and without limitation, state diagram 200 shows a handshaking operation between RTSP client 202 and RTSP server 208 which includes an RTSP sync request 210 sent by the RTSP client to the RTSP server, followed by an RTSP sync/acknowledgment message 212 sent by the RTSP server to the RTSP client and a corresponding RTSP acknowledgment 214 sent by the RTSP client to the RTSP server in a standard manner.

Once connection between the RTSP client and server has been established, the RTSP client sends an RTSP Describe request 216 to the RTSP server. A Describe request may include an RTSP universal resource locator (URL) (e.g., rtsp://...), and the type of reply data that can be handled. This reply may include a presentation description, typically in Session Description Protocol (SDP) format, although the invention is not limited to any specific data format or protocol. Among other things, the presentation description lists the media streams controlled with the aggregate URL.

Rather than being received by the RTSP server, however, the RTSP Describe request 216 is first intercepted by the MNC client. Information associated with the RTSP Describe request is then sent by the MNC client to the MNC server in a separate message 218. The RTSP Describe request is then forwarded by the MNC server in a separate message 220 to the originally intended destination; namely, the RTSP server. By intercepting the signaling traffic stream, the local MNC client can obtain information regarding one or more characteristics of the data (e.g., data size, format, etc.). The RTSP server then sends an RTSP OK message 222 to the RTSP client in response to the RTSP Describe request confirming receipt of the information contained in the RTSP Describe request. This confirmation message is intercepted by the MNC client before being forwarded, in a separate message 224, to the RTSP client.

Next, the RTSP client sends a Setup request 226 to the RTSP server. A Setup request, in a standard RTSP, specifies how a single media stream must be transported. This must be done before a PLAY request is sent. The Setup request preferably comprises the media stream URL and a transport specifier. This specifier typically includes a local port for receiving RTP data (e.g., audio or video), and another port for receiving RTCP data (e.g., meta information). In this scenario, the RTSP client is specifying that ports A and B be used for data transmission. The RTSP Setup request is intercepted by the MNC client and the information contained therein is sent to the MNC server in a separate message 228. The MNC server performs a port replacement, substituting ports A and B with ports C and D, respectively. The MNC server then sends a modified Setup request 230 to the RTSP server specifying that ports C and D be used for data transmission. This modified Setup request is sent to the RTSP server transparently, such that the RTSP server thinks the request was originated by the RTSP client. The RTSP server sends a confirmation reply 232 to the RTSP client acknowledging that ports C and D are to be used for data transmission. This message is intercepted by the MNC client which sends a modified message 234 to the RTSP client confirming that ports A and B and being used for data transport as intended. In this manner, the MNC client and MNC server function together to control traffic streaming such that data sent by the RTSP server on ports C and D is received by the RTSP client on ports A and B, respectively, without any awareness of the port replacement. This principle can be extended, in accordance with other embodiments, to various other communication protocols (either standard or proprietary), as will become apparent to those skilled in the art given the teachings herein.

Signaling Bundling

Signaling bundling, as the term is used herein is intended to broadly refer to a concatenation of multiple data frames from one or more intercepted TCP or UDP connections, resulting in a bigger data frame. This connection interception approach may introduce latency to the applications sending and receiving traffic, but offers beneficial optimizations in certain scenarios.

Consider, by way of example only, a scenario in which, on its cellular phone connected to a cellular network, an IM (Instant Messaging) user sends a message and waits a couple of seconds between messages. Once the first message is sent, the phone establishes a signaling path to a base station. To preserve battery life, the cell phone may then move into an idle mode, or alternative power-conservation mode. When the user pushes another message seconds later, the device establishes a new signaling path. On a modern phone, many applications may be running concurrently, making constant queries to the network to push email, access social networking tools and conduct other receptive actions. This constant signaling traffic imposes a severe burden for mobile device networks (which need to allocate a channel for each such short message and then immediately release it—networks which were conceived for long-lived data connections, such as a phone call) and a battery-draining issue for cell phone users. By intelligently aggregating signaling traffic into larger frames, signaling bundling greatly reduces the battery impact and optimizes the performance of a provider's network while only slightly impacting latency, an issue that may not even be perceptible to the users depending on the class of application(s) utilized.

Selective Compression, Transcoding and Resampling

To further optimize the performance of the TCP and UDP connections intercepted by the TPA, selective compression and transcoding can be applied to the traffic. Selective compression, as the term is used herein, is intended to broadly refer to the selective application of data compression (e.g., by an intelligent processor or the like) based on one or more characteristics of the data, including, for example, content type, content size and signature. Transcoding and resampling may be defined as a server-side TPA functionality that is operative to modify (e.g., reduce) the quality, resolution, and/or frame rate of an image or video, or alternative multimedia content, for modifying (e.g., reducing) the size thereof. For instance, when a web page is retrieved, the HTML code can be compressed on-the-fly, a JPG image may be further compressed, a video may be transcoded while being streamed, and a binary file may be selectively skipped.

Delta Transmission

Modern data communication is very inefficient and the same binary objects (e.g., spreadsheets, images, audio files, etc.) are often retransmitted multiple times. Some applications allow for caching; for instance, a web browser can cache certain non-dynamic elements of a web page. However, a vast majority of modern data communication wastes precious network resources by retransmitting the same objects constantly. For example, co-workers collaborating on a document may email one another with incremental updates to the document multiple times per hour. With each email, the entire file gets retransmitted.

Delta transmission, as the term is used herein, is intended to refer broadly to a methodology (e.g., which may be performed in a TPA module or alternative processor) that detects the first instance that an object has been transmitted and thereafter only transmits incremental changes associated with the object to a given destination(s). To accomplish this, each endpoint preferably maintains an object store with an index. When a connection is intercepted, each object over a configurable size transmitted as part of that connection is assigned a unique identification (ID), such as, for instance, a hash function, and is subsequently placed in the object store. With each subsequent connection, heuristics are preferably used to determine the likely similar objects in the store. Heuristics can be based on one or more prescribed characteristics, such as, but not limited to, file name, file size, file type, sender/receiver identifiers, etc.

After a positive match, a delta binary diff pass (i.e., a function which returns a difference between files) is applied to the object and only the differential information is transmitted to the destination. The TPP protocol is then used to signal the destination that a delta transmission has been activated with a message that carries the object's unique ID in the receiver's object store. When the delta binary diff is received, the corresponding object is pulled out of the object store; the binary diff is subsequently applied to the object and the original object is re-injected into the TCP stream, which carries it to its final destination.

TCP/IP Connections Migration

Migration of a TCP/IP connection preferably refers to replacing at least one of the peers with another process that can reside on the same or on a different system. There are a number of situations in which the migration of TCP/IP connections can be useful; for instance, when there are requirements of mobility, load balancing, QoS, fault tolerance, and security. The TPA preferably includes a connection migration (ConnMig) methodology that is preferably able to migrate both ends of a connection, does not require cooperation on both ends, is fully transparent to an endpoint not migrating, allows an endpoint to be migrated more than once, and may be used by a stream (as opposed to message) socket regardless of its internal state (even unconnected state—note that migrating an unconnected socks is interesting especially for server-side use, e.g. migrating a socket in a listen state).

Due the nature of the TPA, it should be noted that we discuss the migration of internal multi-path transport sockets (e.g., MNTP sockets) that is the protocol used to carry the traffic of TCP/UDP connections that have been intercepted by the proxy. It should be appreciated that a number of solutions for the migration of TCP/IP connections, without proxy interception, already exist (e.g., M-TCP, SockMi, MSOCKS, ROCKS/RACKS, TCP Migrate, TCPcp, etc.), as will be known by those skilled in the art.

In the context of an illustrative embodiment of the present invention, migrating TCP/IP connections may involve one or more of the following:

migrating one endpoint or both TPA endpoints;

migrating one endpoint, including the Internet multi-path transport sockets (e.g., MNTP sockets) and all TCP/UDP intercepted connections mapped to those sockets, including, for example, TCP/UDP connections initiated on the other end of the proxy (for instance, with "logical" connections, such as RTSP, that negotiates and opens multiple TCP/UDP connections on both ends); and migrating a multi-path transport socket on one TPA endpoint and turning it into a TCP socket on another TPA endpoint.

A ConnMig process, according to an exemplary embodiment, preferably involves at least two functional modules in each of the proxy endpoints; namely, a SMP (socket migration processor) module and a SMM (socket migration manager) module. It is to be appreciated that, according to other embodiments, the connection migration methodology may comprise other or different modules for implementing the functions thereof, and that the invention is not limited to any specific type and/or number of functional modules employed.

The SMP module is preferably adapted for: (1) saving/ restoring the state of migrating sockets during an import/ export phase; (2) exchanging information about migrating sockets with the SMM module; and (3) providing low-level primitives to activate and control the socket migration facility. A primary function of the migration mechanism is preferably to preserve the referential integrity among the data structures that define the state of a socket. The SMP module manages TCP/UDP sockets and multi-path transport sockets in a standard fashion through the use of abstraction data structures, as will be known by those skilled in the art. Besides the socket states, the SMP module preferably keeps track of "in-flight data;" that is, data found in receive queues/buffers (e.g., data received by the multi-path transport sockets but not yet acknowledged (ACKed) or transmitted to corresponding TCP/UDP connections) and transmit queues (e.g., data intercepted from the TCP/UDP connections but not yet transmitted by the corresponding multi-path transport sockets or not yet acknowledged).

The SMM module preferably holds sockets ready to be imported in multiple lists corresponding to one or more states of each group of sockets (TCP/UDP or multi-path transport); namely, bound sockets, listening sockets and connected sockets. These lists change their length dynamically when a socket is received from the SMM module or when another proxy endpoint imports a socket. The SMM module is operative in combination with the SMP module to support the socket migration mechanism.

The SMM module may carry out different tasks depending on a given situation. For example, during an export phase, the SMM module is preferably operative to read the state of exporting sockets from SMP module internal buffers. During a negotiation phase, the SMM module is preferably operative to communicate with one or more other SMM modules running on other TPA hosts in order to select where to migrate the socket. During an import phase, the SMM module is preferably operative to write a state of importing sockets to the SMP module internal buffers. Complete socket migration entails searching for a TPA host willing to import the socket. The SMM module utilizes the TPP protocol, or a suitable alternative protocol, to communicate with other SMM modules running on other TPA hosts.

Negotiation over TPP preferably follows a plain request-response confirm methodology as follows:

When a proxy host A exports a socket, it sends a request in multicast to other SMM modules running on other proxy hosts.

When a request arrives, a host replies provided that either the socket is explicitly exported to that host or no specific target proxy host is defined in the request.

If proxy host A does not receive a valid response within a predefined timeout period, the migration fails.

The first valid response triggers a confirmation mechanism by which proxy host A notifies all SMM modules that the socket has been successfully migrated. Other responses arriving after the first one are simply discarded. Other more sophisticated policies to select a valid response can be employed, in accordance with other embodiments of the invention; based on rules or heuristics for instance. For example, it could be useful to maintain statistics on previous migrations and select a target proxy host based on achieving load balancing between proxy hosts.

Following a successful migration acknowledgment, IP redirection is preferably automatically handled by the multi-path transport protocol, which initiates a new aggregation with the TPA host that accepted the socket import. Due to the nature of the TPA, application synchronization is handled automatically.

Distributed Reflectors

One of the disadvantages of a standard TPA network topography (e.g., one that would have a TPA client in a client device and a TPA server in a service provider's network) is that, depending on where the endpoint is deployed, it can cross administrative boundaries or make the network engineering complicated. By way of example only, consider a scenario whereby the TPA is deployed on a multi-homed mobile device equipped with two cellular network interfaces provisioned on two separate service providers. If the other TPA endpoint is deployed outside of each respective service provider's network and reachable from both networks, network engineering is minimal; traffic gets transmitted through the respective networks to the TPA destination. If, however, the TPA endpoint is deployed within one provider's network, this network configuration assumes that the traffic routed on the other provider's network can be routed into the first provider's network, crossing administrative boundaries. This scenario creates two potential issues: (1) cross-administrative routing is generally not an option unless both providers have a peering agreement in place; and (2) the solution forces a provider to accept another provider's traffic on its network—networks that are already saturated.

To address this issue, the TPA according to an aspect of the invention preferably implements distributed reflectors. In deflector mode, a TPA endpoint is only responsible for accepting a partial multi-path transport protocol stream (e.g., an MNTP stream) from one TPA endpoint and "reflecting" it to another TPA endpoint. The reflecting operation essentially means forwarding data traffic from one stream and syncing up its state with the destination TPA endpoint.

Different policies can be applied to reflections, which can be unidirectional or bidirectional. Policies can be set based on prescribed characteristics, such as, for example, type of traffic, value-added offering, load balancing and traffic engineering policies.

Figure 3:
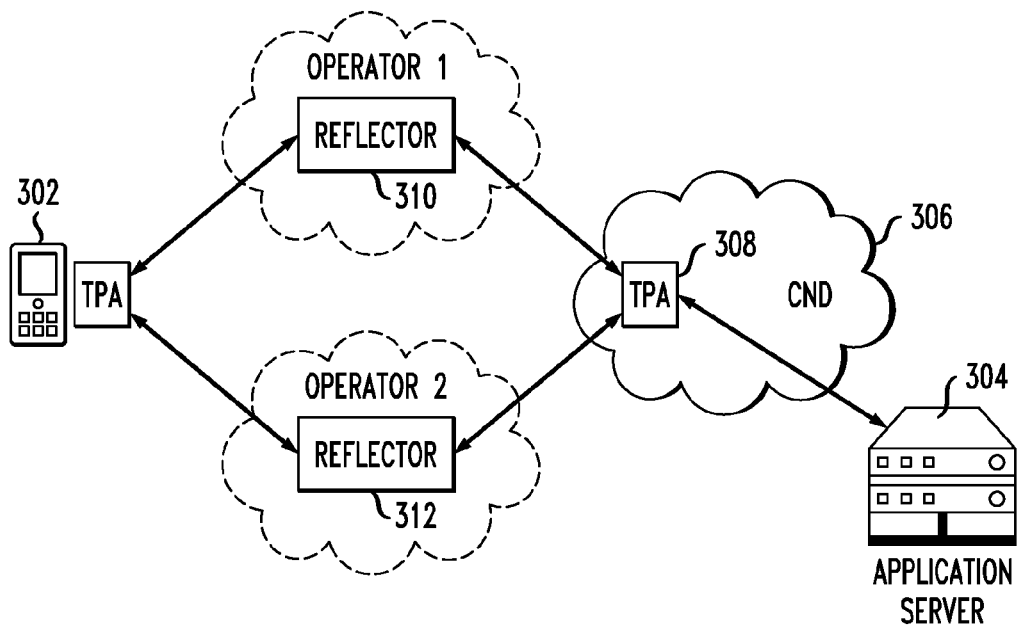
FIG. 3 illustrates an exemplary implementation of a TPA server deployed within a content delivery network (CDN), according to an embodiment of the present invention.

FIG. 3 illustrates an exemplary system 300 for implementing distributed reflectors, according to an embodiment of the invention. The system 300 includes a client device 302 and an application server 304 operatively communicating with one another via a content delivery network (CDN) 306. As shown in the figure, a natural place to deploy a TPA server 308 is within the CDN 306 or within the provider's network with the TPA endpoint deployed within the CDN or on the application server itself System 300 employs two reflectors 310 and 312, configured in a distributed manner, although the invention is not limited to any specific number of reflectors.

Figure 4:
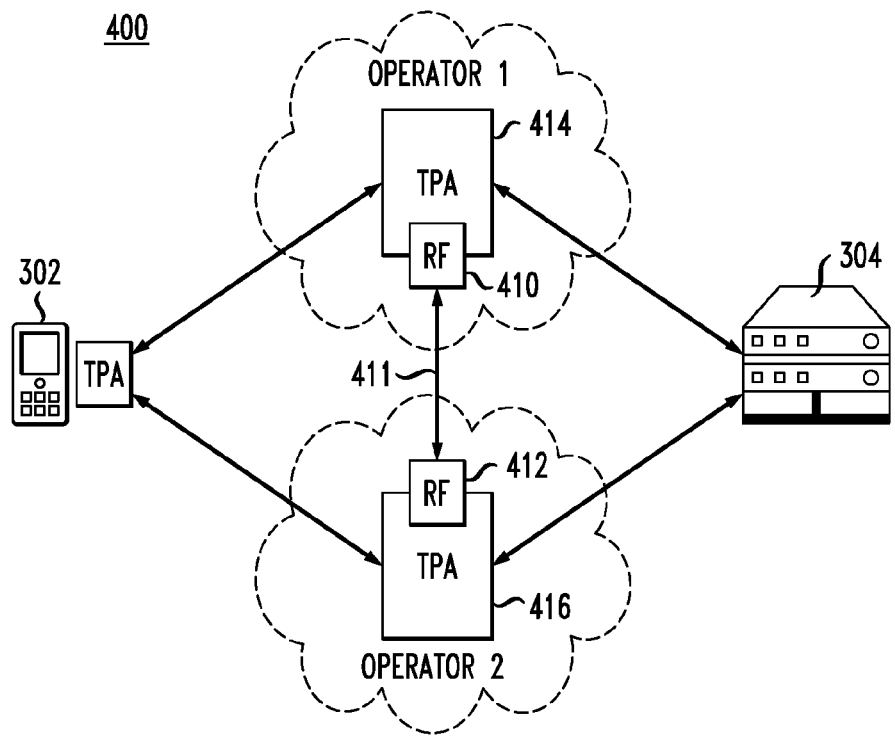
FIG. 4 illustrates an exemplary methodology for bidirectional reflection and peering, according to an embodiment of the invention.

FIG. 4 illustrates an exemplary methodology for performing bidirectional reflection and peering, according to an embodiment of the invention. In this embodiment, a system 400 employs two reflectors 410 and 412 having a bidirectional communication channel 411 established therebetween. One of the reflectors 410 may be controlled by a first TPA 414 and the other reflector 412 may be controlled by a second TPA 416, as shown.

Figure 5:
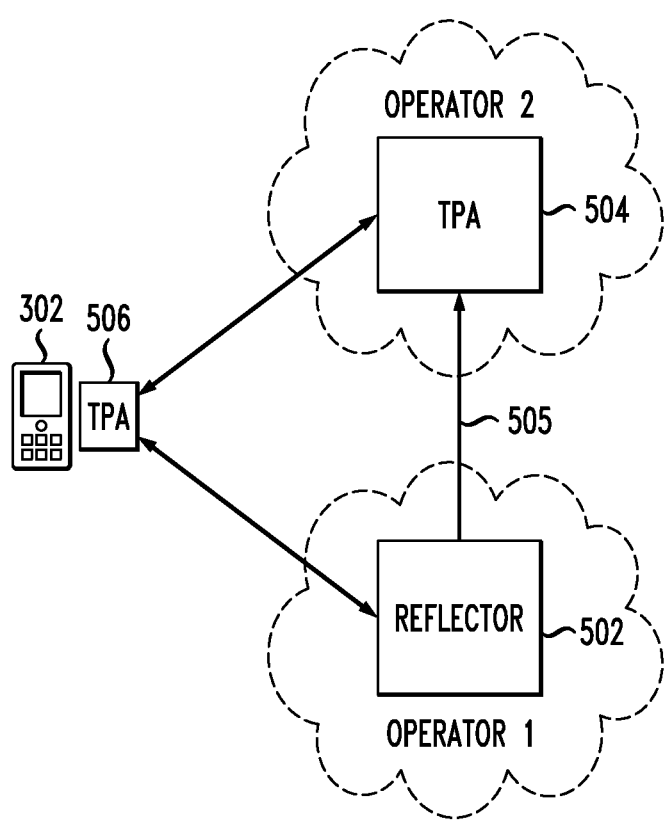
FIG. 5 illustrates an exemplary methodology for unidirectional reflection and peering, according to an embodiment of the invention.

FIG. 5 illustrates an exemplary methodology for performing unidirectional reflection and peering, according to an embodiment of the invention. In this embodiment, a system 500 includes a reflector 502 associated with a first operator (Operator 1), the reflector having a unidirectional communication channel 505 established with a first TPA 504 associated with a second operator (Operator 2). The reflector 502 and TPA 504 each are in bidirectional communication with a second TPA 506 associated with client device 302.

Smart Caching and Buffering

The TPA according to embodiments of the invention is preferably operative to work closely with a multi-path transport protocol (e.g., MNTP), connecting its endpoints to optimize the transmission of application data traffic. The multi-path transport protocol aggregates the capabilities of multiple access networks simultaneously to the sum of each individual bandwidth available. If the access networks are wireless, the total available bandwidth can vary widely due the short-lived nature of some wireless networks (for instance, users traversing Wi-Fi networks), signal fading or link errors, and the nature of the technology itself (for instance, a cellular connection may degrade from its 3G variant, to its 2.5G or 2G variant, cutting the observable throughput by as much as 300%). As a consequence, the bandwidth available to applications taking advantage of the TPA can continuously change. For some applications, such as, for example, streaming video, a drastic change in available throughput may lead to intermittent interruption of service as the buffer on the receiving end waits to be filled. Newer streaming technologies have introduced adaptive bit rate and compression based on available bandwidth, which is determined by periodic probes sent by the streaming server or based on feedback periodically exchanged on a parallel control channel, or an alternative means for determining available bandwidth at any given time. Similarly, certain streaming technologies offer multiple streams encoded for different classes of link performance and are able to switch streams dynamically to provide the best experience based on instant throughput available between peers.

While these techniques allow a client to recover faster from interruptions of service, it is not an optimal solution. In accordance with aspects of the invention, the TPA further improves performance by introducing the concept of smart buffering. Using techniques of smart buffering, the TPA utilizes its direct knowledge of instant bandwidth availability and capability, concurrent stream count and impending changes to the set of aggregated access networks (e.g., reported by the multi-path transport through a socket API or alternative means) to beneficially adjust the amount of caching on behalf of the applications, in an intelligent manner, tracking the variance in link performance.

The TPA, according to embodiments of the invention, preferably already implements buffers to store data intercepted from TCP/UDP connections and fed to the multi-path transport protocol on one end and retrieved from the multi-path transport protocol and fed to the TCP/UDP connections on the other end. For smart caching, both proxy endpoints are adapted to implement additional dynamic buffers mapped to specific application streams (e.g., intercepted TCP/UDP connections).

Consider the following illustrative scenario wherein client application A running a transparent proxy B locally communicates to a streaming server D through a proxy endpoint C (e.g., running either on a streaming server or on a routing path to an application server). When client A requests a video from server D, the connection is accepted locally by proxy B and its payload is routed to proxy endpoint C over the multi-path transport protocol and a new connection is established to server D. When server D starts streaming, the video traffic flows to client A, through the proxy [C, B]. When proxy C is alerted that the performance of the [B, C] link is about to change, it transmits a notification to proxy C (e.g., over TPP) containing the expected bandwidth improvement, degradation, or offline time. Upon reception of the notification, proxy C immediately requests additional video frames from server D to fill up its local caching buffer and immediately starts transmitting to proxy C for storage in the remote caching buffers, ready to feed the intercepted TCP/UDP connections of client A, thereby ensuring the best playback and concealing the variance in link performance in a transparent manner. Similarly, each proxy endpoint may request that a specific object (e.g., video, file, etc.) be cached remotely on its behalf for an amount of time (prescribed or arbitrary) in order to optimize certain operations, such as, for example, a file download. Once the operation (e.g., file download) has completed, transmission of the specific object can resume as normal.

Similarly, when more than one client (say, for example, clients A and E) are accessing the same remote content around the same time on server D, proxy C can pre-fetch the content from server D and cache it locally. Proxy C then supplies the content to clients A and E from its local cache. This method saves bandwidth between server D and proxy C when the cached content is requested many times (e.g., a popular video file). This method is also applicable when the content is dynamically generated.

Smart caching and buffering, when used in concert with stack freezing (described in further detail below), allows essentially instant reconnection and resume operations, regardless of the duration of the interruption (e.g., a few seconds or a couple months). Furthermore, smart caching can be used to preload content in an intelligent manner for web browsing (e.g., fetching links proactively) or audio streaming (e.g., fetching a next track proactively).

TCP Stack Freezing

The TPA, in accordance with embodiments of the invention, preferably works closely with the multi-path transport protocol (e.g., MNTP), connecting its endpoints to optimize the transmission of application data traffic. The multi-path transport protocol aggregates the capabilities of multiple access networks simultaneously to the sum of each individual bandwidth available. The TPA, in an embodiment of the invention, includes a TCP stack freezing (TSF) module, or alternative processor, operative to sustain application sessions even through suspend-and-resume cycles and loss of connectivity.

Figure 6A:
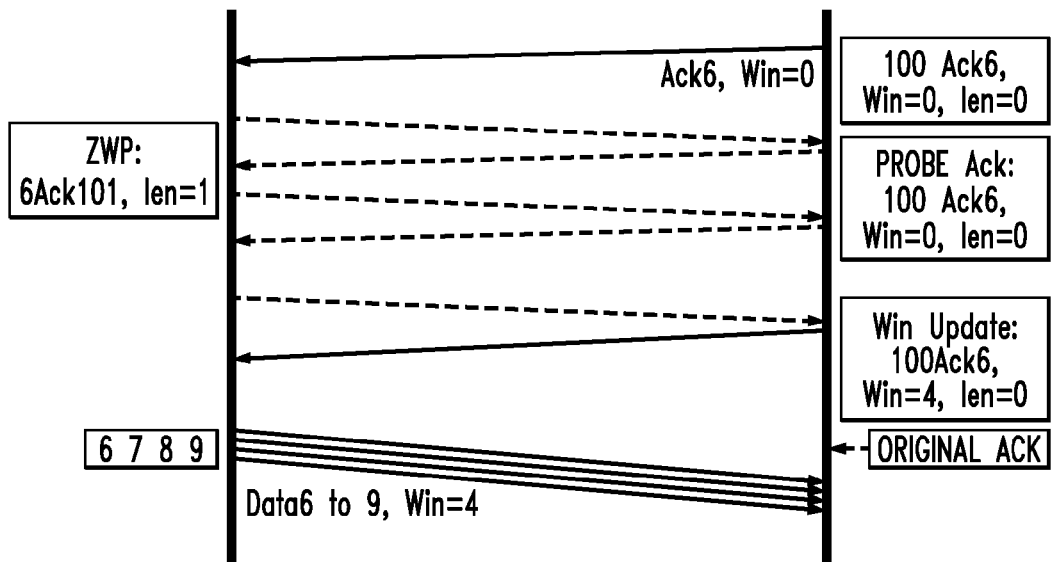
FIGS. 6A and 6B illustrate exemplary methodologies for implementing TCP freeze operations, according to an embodiment of the invention.
Figure 6B:
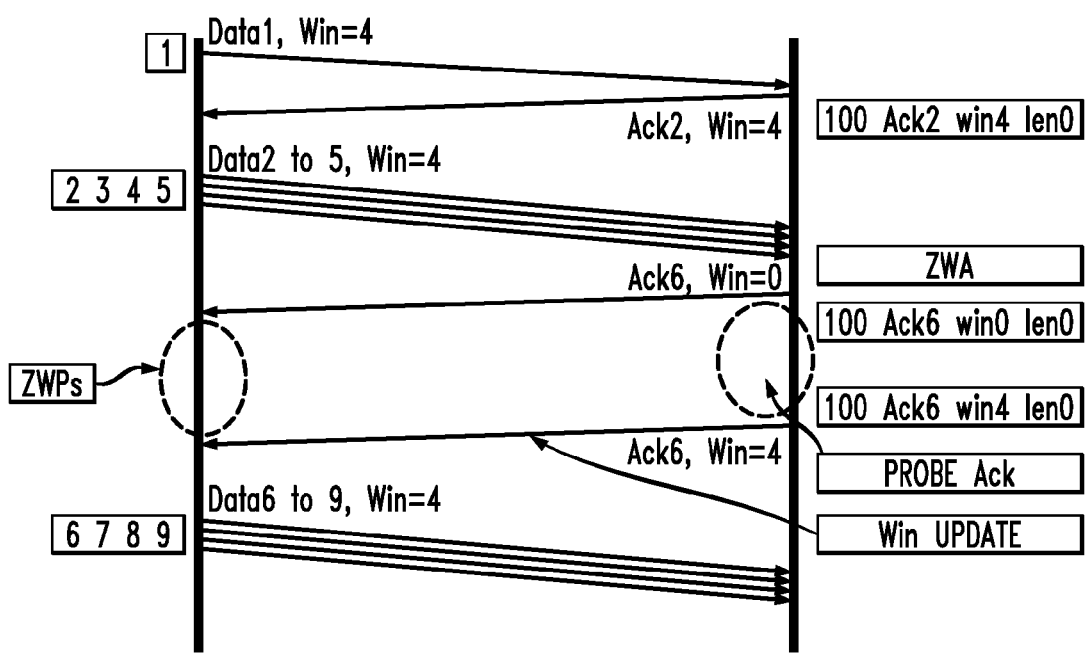

FIGS. 6A and 6B illustrate exemplary state transition diagrams 600 and 650, respectively, depicting implementation of TCP freeze operations, according to an embodiment of the invention. The system preferably uses a feature implemented in standard TCP implementation in that when a receiving end host does not have adequate buffer space left, it informs the sender to stop sending more packets.

By way of example only and without loss of generality, the basic concept is to freeze all TCP timers when the receiving window is full. When a sender transmits a packet, the receiver sends back an acknowledgment (Ack) of receipt of the transmitted packet along with an updated window size, for instance, enough to store four more packets. The sender then sends four more packets as allowed by the specified window size (Win=4). When the receiver has received all four packets but does not want the sender to transmit any more packets, it sends an acknowledgment of the last received packet with an updated window size of zero (Win=0). Such an acknowledgment is referred to herein as a zero window advertisement (ZWA), as shown in FIG. 6B.

After receiving the ZWA, the sender knows it cannot send any more packets but instead of terminating the connection, the sender enters a persistence mode and periodically sends a probe packet to the receiver. The probe packet may comprise, for example, a "heartbeat" included in the TCP protocol. This packet is referred to herein as a zero window probe (ZWP), as shown in FIG. 6A. After receiving the ZWP, the receiver sends the ZWA to the sender with the same acknowledgment number and a window size of zero. This process repeats thereby maintaining the connection. When the receiver wants to continue the transmission, it sends the acknowledgment with an updated non-zero window size, and normal operation is resumed.

The TPA system is already capable of intercepting TCP connections on both endpoints. To perform stack freezing, an additional TSF module is implemented on either or both sides. When connectivity is interrupted between both ends of a TPA system, the TSF module sends a ZWA or ZWP to the local host TCP as required to keep the TCP connection active. In addition to sending a ZWA or ZWP, as appropriate, the TSF module is preferably also responsible for tracking and storing the correct acknowledgment number for each TCP connection.

II. Multi-path Transport Protocol Capable of Distributing Traffic Over Multiple IP Networks Simultaneously MNTP (multi-network transport protocol) is a connection-oriented protocol operating at a transport layer of the OSI model. It is designed to transmit and receive multiple streams of data simultaneously over concurrent data paths (e.g., an aggregation) between two or more multi-homed endpoints that have established a network connection therebetween. MNTP is especially designed to manage and optimize network connections established over wireless links.

As an initial matter, MNTP will be described herein using the following non-limiting definitions for certain terminology used in connection therewith.

Endpoint

In the context of MNTP, an endpoint may be broadly defined herein as a logical sender/receiver of MNTP packets. An endpoint characterizes the sending or receiving side of an aggregation. On a multi-homed host, an MNTP endpoint may be represented to its peers as a set of eligible bound addresses which the MNTP packets can be sent to and/or received from. The endpoint also preferably holds a list of aggregations that it represents.

Aggregation

An aggregation may be broadly defined herein as a connection between two or more endpoints. It is visible from an application level of the OSI model. Aggregation can be either a point-to-point type, where exactly one aggregation peers to exactly one other aggregation, or a one-to-many type, where one server aggregation peers to N endpoints, where N is an integer greater than one. In the latter case, the aggregation supports the concept of broadcast messages (e.g., one message sent to multiple endpoints) and the peeling-off of an aggregation where a point-to-point dedicated aggregation is created between two peers that were in a one-to-many aggregation.

Stream

In the context of MNTP, a stream may be broadly defined herein as a sequence of user messages that are to be delivered to an upper-layer protocol (e.g., though an MNTP socket API) in order relative to other messages within the same stream.

Transport

A transport represents a link between a pair of endpoints' bound addresses IP:PORTs tuples. Each transport has a local address:port and a peer address:port. Each transport independently manages its own congestion control.

Packet

Messages between MNTP endpoints may be referred to as MNTP packets. Each packet preferably comprises an MNTP header followed by one or many MNTP chunks.

Chunk

A chunk is contained within an MNTP Packet. A chunk as used herein is intended to be defined broadly as a fundamental unit in information exchange among MNTP aggregations. Based on their functions, chunks can preferably be categorized into two types; namely, CONTROL chunks and DATA chunks. A CONTROL chunk carries the administration/management/configuration information and might trigger MNTP change from one state to another. For DATA chunks, the payload within a DATA chunk represents a piece of one message from one corresponding application stream.

Socket

An MNTP socket may be broadly defined herein as an interface that an application uses to communicate with the MNTP protocol. The features and functions of MNTP are represented to the application in the form of socket application program interfaces (APIs). An MNTP socket keeps a reference to the corresponding endpoint it is bound to and a queue to buffer the messages transferred through MNTP before they are passed to the applications. The MNTP socket is also characterized by a set of socket parameters.

MNTP is a connection-oriented protocol that aims to be flexible and preferably includes one or more of the following features:

Multi-path Concurrent Transmission

MNTP implements concurrent transmission of data traffic from a source to a destination host via two or more end-to-end data paths. A host is multi-homed if it can be addressed by multiple IP addresses. When bulk data from an application (or applications) is sent to MNTP, it is sliced up into multiple chunks and passed to a scheduler engine, or alternative processor, that selects a transport to send the chunk. Chunks queued for a specific transport are concatenated in an MNTP packet and transmitted to the destination over the network interface corresponding to the transport.

Reasons for implementing multi-path concurrent transmission are numerous and include, but are not limited to, improving the bandwidth available to applications, reducing latency for real-time, latency-sensitive applications, increasing link reliability for an application (e.g., using data mirroring), or even special facilitating communication mode for applications (e.g., LPI—low probability of intercept) or increasing security for the applications.

Active and Passive Link Performance Probing and Estimation

MNTP is preferably operative to estimate the performance (e.g., bandwidth, round trip delay time (RTT), jitter, etc.) of each transport in order to optimize the scheduling and concurrent transmission of data traffic. Failure to accurately estimate the available bandwidth and latency can result in suboptimal aggregated bandwidth and may introduce large out-of-ordering which further reduces throughput seen by the applications. MNTP introduces multiple techniques to estimate path throughput and delay. Such estimation is performed either passively (e.g., measurements on transmitted traffic) or actively, for example using special probes. Active probing is more accurate but generally adds overhead complexity and wasted bandwidth.

Passive bandwidth and latency estimation—Since MNTP is adapted to transmit data over multiple data paths concurrently, it can use the data sent and acknowledged to measure RTT, smoothed RTT (SRTT) and RTT Variation (RTTVAR) on a per-path basis. Passive and non-intrusive bandwidth is achieved using low-pass filtering on a rate of returning MNTP selective acknowledgments to estimate the bandwidth available for that connection.

Active bandwidth and latency estimation—MNTP is operative to implement an active probing scheme which may be referred to herein as probe train exponential pattern probing (PTEPP). PTEPP uses a novel exponentially-spaced train of UDP probes sent with an exponential packet flight pattern strategy to dynamically estimate the available bandwidth along an end-to-end network path. PTEPP is designed to be highly efficient (wasting less bandwidth); when estimating a network path over the range of rates [R1, R2] Mbps, PTEPP only uses log(R2)–log(R1) packets. Each UDP packet preferably carries a sender timestamp, or alternative chronological identifier, which the receiver uses along with its own local timestamp in the delay estimation process. Probe packets preferably travel one-way, from sender to receiver, and the receiver performs the estimation.

Support for Polymorphic Scheduling

MNTP, according to embodiments of the invention, preferably implements a novel scheduling scheme, referred to herein as polymorphic scheduling. A polymorphic scheduler is a scheduler that is adapted to reconfigure itself based, at least in part, on one or more characteristics of the connections it aggregates and the traffic requirements imposed by applications. By default, MNTP implements a bandwidth-aware scheduling with the objective of maximizing a ratio of in-order delivery over multiple paths. Bandwidth estimation on paths that have not been used over a certain period of time can be performed using the PTEPP scheme, while bandwidth estimation on active paths is preferably performed using a passive low-pass filtering technique, or alternative bandwidth estimation means.

Scheduling is preferably performed on the sender side only using available window size, latency estimates, bandwidth estimates and in-flight and queue traffic computations. However, some applications may request specific scheduling strategy. For instance, an application may request traffic to be mirrored in order to increase reliability or quality of a video stream; another application may request that its traffic be mapped onto a specific path for security reasons, etc. Additionally, the nature of the access networks involved may influence how the ingress traffic is being scheduled. For instance, retransmission and acknowledgments are better sent on a 3G cellular interface rather than using a Wi-Fi interface to avoid self-contention issues. One low-bandwidth but reliable link may work in conjunction with a high-bandwidth but lossy link to improve performance; links may have different pricing considerations and applications may request a low-cost routing. This is in addition to specific QoS mapping requirements, quotas and priorities and the like assigned by applications. As such, the MNTP polymorphic scheduler is able to reconfigure itself to reflect those requirements.

In addition, according to embodiments of the invention, MNTP supports a "hot-swap" (i.e., loading and unloading while data is being transmitted) scheduling mechanism allowing pre-determined and self-contained scheduling strategies to be deployed—upon changes in conditions or requirements—even in the presence of in-flight traffic. A good example of a scheduling mechanism/strategy is a LPI (low probability of intercept) scheduler. When communication is established over a single wireless link, it is possible to triangulate the location of the sender/receiver. An LPI scheduler transmits sequential parts of a logical communication flow using randomly selected data paths. In this manner, instead of being transmitted concurrently over multiple data paths, the traffic is transmitted sequentially over a single data path that changes randomly, at random intervals.

Out-of-order Mitigation

As is the case with TCP, reordering introduced in an MNTP flow generally degrades throughput. When multiple paths used for concurrent transfers have different delays and/or bandwidth characteristics associated therewith, a sender can introduce significant packet reordering in the flow. Reordering is an inherent consequence of concurrent multi-path transfer and is difficult to completely eliminate in an environment where the end-to-end path characteristics are constantly changing or are unknown a priori, as in the case of a wireless network, for example. MNTP, according to embodiments of the invention, preferably introduces at least two fundamental techniques to mitigate out-of-ordering effect: displacement frequency map (DFM) and reordering density map (RDM); and reordering storm avoidance (RSA), details of which will be presented herein below.

Displacement Frequency Map (DFM) and Reordering Density Map (RDM)—RDM may be broadly defined herein as the distribution of displacements of packets from their original temporal positions, normalized with respect to the number of packets. An early packet corresponds to a negative displacement and a late packet corresponds to a positive displacement, although such assignment is essentially arbitrary. A threshold on displacement may be used to keep the computation within prescribed bounds. The choice of threshold value may be a function of the measurement uses and constraints, such as, for example, whether duplicate packets are accounted for when evaluating these displacements.

DFM can be viewed as a normalized histogram of the occupancy of a hypothetical buffer that would allow recovery from out-of-order delivery of packets. If an arriving packet is early, it is added to the hypothetical buffer until it can be released in order. The occupancy of this buffer, after each arrival, is used as a measure of reordering. A threshold, if employed, may be used to declare a packet as lost, thereby keeping the complexity of computation within certain bounds. The threshold may be selected based on application requirements in situations where the late arrival of a packet makes it useless, e.g. in a real-time application. Both DFM and RDM are computed at the receiving end. MNTP preferably uses its signaling functionality to provide feedback on reordering to the sender, which, in turn, may use such information to modify (e.g., optimize/refine) its scheduling accordingly.

Reordering Storm Avoidance (RSA) scheme—Reordering can cause a number of side effects that are preferably addressed by RSA, including, for example:

(a) unnecessary fast retransmissions (e.g., when reordering is observed, a receiver sends gap reports to the sender which uses the report to detect loss through a fast retransmission procedure. However, this causes two issues: namely, each retransmission is assumed to occur due to a congestion loss, the sender reduces its congestion window for the destination on which the retransmitted data was outstanding and a congestion window overgrowth problem causes a sender's congestion window to grow aggressively for the destination on which the retransmissions are sent, due to acknowledgments (ACKs) received for original transmissions. MNTP is operative resolve this issue, for example by implementing virtual queues per destination within the sender's retransmission queue, applying the retransmission procedure on a per-destination basis without affecting the sender's behavior.);

(b) unnecessary congestion window reduction (e.g., a congestion window algorithm in MNTP allows growth in a congestion window when a new cumulative acknowledgment is received by a sender. When selective acknowledgments (ACKs) with unchanged cumulative acknowledgments are generated due to reordering and later arrives at the sender, the sender does not modify its congestion window, assuming the loss is due to congestion and not reordering. Since a receiver naturally observes reordering, many selective acknowledgments are sent containing new gap reports but not new cumulative acknowledgments. When these gaps are later acknowledged by a new cumulative acknowledgment, congestion window growth occurs but only for the data newly acknowledged in the most recent selective acknowledgment. Data previously acknowledged through gap reports will not contribute to congestion window growth. MNTP solves this issue by implementing a congestion window algorithm that uses knowledge of transmission destination to deduce in-order delivery per destination and uses selective acknowledgments, which acknowledge this data to update the corresponding congestion window); and (c) a common design for transport protocol used in the Internet is to send an acknowledgment packet after receiving two DATA packets to reduce acknowledgment traffic in the Internet, thereby saving processing and storage at routers on the acknowledgment path. However, reordered DATA packets need to be acknowledged immediately. Due to frequent reordering, this can often cause a receiver to not delay acknowledgments. To prevent this increase, MNTP preferably always delays acknowledgments, irrespective of whether or not data is received in order.

Configurable Payload Expiration Support

MNTP provides partially reliable service—e.g., a service that allows applications to specify, on a per-message basis, rules governing how persistent the transport should be in attempting to send a message to the receiver. MNTP preferably defines multiple levels of partially reliable services: expiration, buffer size and number of retransmissions.

When one or more messages are expired, MNTP preferably notifies its peer endpoint using a specific control chunk containing sequence numbers of the expired messages. The receiving side treats the messages as if they were received. Additionally, the control chunk may contain information about the transport on which the message should have been sent.

In one embodiment of the invention, MNTP fully supports configurable payload expiration on one or more streams composing the aggregation formed by MNTP. In particular, MNTP preferably employs one or more unique congestion algorithms to handle expired messages. The congestion algorithms are operative to ensure that sent but unreceived messages are not counted towards congestion control based decision-making. MNTP further facilitates the notification of expired messages to avoid blocking of in-order delivery messages.

Differentiated and Granular Stream Management

MNTP, according to an embodiment of the invention, supports the concept of multiple streams within an aggregation. Streams can be configured to have different properties, including but not limited to reliability, reconfigurable payload expiration, priority, bandwidth requirement, transport and/or channel binding. Within a single aggregation, MNTP can preferably apply different scheduling schemes to provide granular and differentiated management.

Expiration-based service allows applications to specify that some traffic is highly sensitive to timeliness. For instance, it is essentially meaningless to transmit VoIP packets after some prescribed period of time has elapsed. Buffer size service allows applications to specify how much of the data can be stored in a buffer before being recycled (i.e., overwritten) with new data. Retransmission-based service can provide a connected, ordered, but reliable data transfer service, a service very desirable for video transfer for instance.

Support for ROHC (RObust Header Compression)

In accordance with embodiments of the invention, MNTP fully supports ROHC, which reduces the size of its header (e.g., from 32 bytes to 3 bytes, although the invention is not limited to any specific number of header bytes or reduction of header bytes). To accomplish this, MNTP preferably incorporates a compressor on its sending queues and a decompressor on its receiving queues, or alternative processing means.

Per-link Wireless Optimization

In accordance with embodiments of the invention, MNTP implements link-specific algorithms for congestion window growth, congestion window reduction, back-off algorithm and/or slow start algorithm; this scheme allows MNTP to further optimize the transmission over each underlying wireless access network. This optimization is preferably able to work in conjunction with the active and passible link performance probing and estimation.

III. Granular Mobile Offloading System for Mobile Devices

Smartphones are driving tremendous increases in mobile data usage, straining mobile networks in the process. As a result, mobile operators are finding it necessary to dramatically increase network capacity while concurrently meeting prescribed performance requirements of their subscriber base. Scaling network capacity using traditional means is an expensive proposition, and thus undesirable. Furthermore, this approach may not even be achievable in some cases; for instance, in very dense areas where radio frequency (RF) spectrum scarcity combined with propagation issues at some frequencies make the solution impractical. In addition, it is estimated that about 70 percent of all mobile data traffic is migrating to the Internet, and under current network architectures, that traffic hops over several core network nodes unnecessarily to reach its final destination.

Two classes of solutions have emerged to alleviate the capacity issue in a cost-effective manner for operators: Wi-Fi and femtocell offload, and offload gateway.

Wi-Fi and femtocell offload—The widespread availability of Wi-Fi, installed in millions of homes and offices around the world, as well as in many smartphones themselves, make Wi-Fi a natural technology choice for mobile operators. Wi-Fi access points and hotspots can ease 3G capacity constraints in a radio access network, as well as in backhaul and core networks, by diverting Internet traffic from the mobile core and sending it directly to the Internet (sometimes referred to as local IP breakout). This methodology can beneficially save enormous data plane capacity for the operators' own services or for third-party services to which it can add value. In addition, vendors of femtocells (tiny home or office base stations) have long touted data offloading as a key benefit for operators.

Offload gateway—As previously described herein, most of the offloading efforts have focused on offloading data traffic from the radio network using, for example, fixed mobile convergence (FMC) technologies, including, but not limited to, Wi-Fi and femtocells. Recently, however, a group of vendors has emerged offering solutions to unburden operators' core networks as well, by offloading Internet-bound traffic before it ever sees its first core gateway. So-called "offload gateways" can sit between an RNC (radio network controller) and an SGSN (service gateway support node), behind the core directly or directly in the ASN (access network node) gateway for a Wi-MAX network, GGSN (GPRS gateway support node) for a HSPA network or on the data and signaling gateways for LTE EPC (long-term evolution—evolved packet core). Regardless of the positioning in the network, the objective remains the same: redirecting Internet-bound data traffic off a carriers' mobile core.

While it may help operators reduce the load from their core networks, both approaches presented above exhibit certain drawbacks. In the case of Wi-Fi and femtocell offload, in order to maximize the use of Wi-Fi offloading, handset vendors force the switchover from the cellular network to Wi-Fi, which, in most cases, breaks existing connections. Protocols such as, for example, IMS (Internet Protocol Multimedia Subsystem), Mobile IP and UMA (Unlicensed Mobile Access), can somewhat reduce the issue, but they either need the Wi-Fi and cellular networks to be operated by the same operator (e.g., in the case of IMS), do not work for real-time traffic such as voice and video (e.g., in the case of Mobile IP), or are missing handset support (e.g., in the case of UMA).

Complete network bypass can be achieved by putting a small application on a subscriber's device which is operative to detect when the device is in a Wi-Fi area and automatically move all the data access to that network. Voice may continue to be delivered via the core network. This approach, however, has some major drawbacks as well. First, the carrier loses visibility and control of their subscribers while they are in the Wi-Fi area. Second, since there is no connectivity between the core network and the device, the carrier is unable to deliver any 3G content, leading to potential loss of revenue. Third, voice service will soon transition from circuit-switched networks to IP networks. If voice is bypassing the core network, the operator is prevented from billing for usage, in addition to voice call termination and routing issues. Fourth, the Wi-Fi network that the subscriber is forced onto may have worse performance than the cellular network and the operator would have no visibility with an unmanaged Wi-Fi network to ensure that the QoS can be maintained or improved.

In the case of offload gateways, such alternative solution is not necessarily a panacea for operators either. Offload gateways are able to determine if a session is Internet bound and if the operator has no value to add to the transaction, the gateway shunts the traffic stream off the carrier network onto the Internet, thereby avoiding the multiple waypoints it would normally travel through in the carrier's core. However, offload gateways are yet another piece of equipment to deploy and an expensive proposition, as they are very resource-intensive due to their need to perform traffic inspection and decision-making at line speed. Additionally, offload gateways do not resolve the signaling storm issue caused by constant, short-lived and periodic updates made by mobile devices.

Accordingly, aspects of the invention provide a system that performs an advanced, granular and managed offloading mechanism using multiple access networks. In accordance with an illustrative embodiment of the invention, a client device, such as, for example, a smartphone or alternative device, equipped with multiple radio access technologies is provisioned with a Dynamic Polymorphic Capacity Concatenation (DPCC™, a trademark of Attila Technologies LLC) system running on the client device as a background service and attached to a corresponding server gateway deployed in a service provider's network, ideally on an ASN gateway directly. The DPCC system provides connectivity while roaming between access networks and across administrative domains, adapting the nature of the aggregated connection to reflect changes in the network environment, application needs, security levels, or user preferences. Thus, DPCC provides multi-network capability, which can be applied to mobile routers, laptops, and handheld devices, and further enhances the wireless security and bandwidth for video, interactive collaboration, gaming, and surveillance, among other applications. The client device is available to leverage a plurality of interfaces to maintain optimum QoS for applications running on the device while being able to perform granular and network-controlled offloading.

In a regular mode of operation, a client utilizes and leverages accessible networks simultaneously to essentially build a dynamic network connection that matches the capabilities of the different networks to the needs of applications in order to maximize their performance and the overall experience for the subscribers. This dynamic network connection has characteristics that are superior to any one of the individual accessible networks. The default real-time, decision-making operations on the client are constrained by policies that are distributed locally or by a server entity.

By adding a layer of signaling between clients and the server, the decision-making becomes a joint client/server transaction, allowing network-controlled management of available network resources based on real-time analytics reporting or other criteria. Advantageously, the process can be entirely client-driven or network-controlled. In a client-driven context, the client may contain local policies that describe default expected behavior for specific access networks, RF performance or application streams, etc. A decision engine dynamically aggregates a set of available access networks so as to optimize the performance of the devices (e.g., QoS, performance of applications, battery usage, etc.). In a network-controlled context, a server preferably instructs the client on how available access networks should be utilized based, at least in part, on network performance, service level agreement (SLA), premium services quality assurance, application requirements, and/or other characteristics.

The client relies on the TPP protocol to periodically report its unique ID, reachable access networks (based on radio events, background scanning or location information), location, network performance report, application streams and expected QoS to the server. The server communicates with the clients to enforce specific multi-path routing policies, send authentication credentials to establish data sessions on roaming partners' networks, update lists of reachable networks in a geographical area (limiting periodic background scanning on the device, a battery draining process), etc.

A system according to embodiments of the invention preferably supports one or more of the following functionalities:

Client-activated and/or network-controlled—The system leaves the client with the flexibility to perform the operation that will make the best use of its resources but can be activated from the supporting network in order to optimize its operation. Network control of the offloading is based, at least in part, on a transaction between the client reporting its network capabilities and the application and server responding with a policy-based decision.

Foreign networks—The client can offload traffic onto networks not controlled by the service operator the client is subscribed to (i.e., foreign networks) without requiring special agreements between both network operators.

Granular offloading—Offloading can be performed on all or a portion of the traffic, reflecting the capabilities of the network it is being offloaded onto (e.g., 40 percent of the total traffic can be offloaded). The offloading can be based, for example, on data type (e.g., only video frames are offloaded), application type (e.g., bandwidth-hogging applications), time-based, QoS-based (e.g., premium services), location-based, load-based (e.g., network load at the RNC), power-based (e.g., battery level on the device), total cost of services, or other criteria as suitable for a given scenario, as well as the aggregated consideration of multiple of such criteria.

Cellular Signaling tunneling support—The system supports the tunneling of cellular signaling over IP allowing mobile core avoidance but keeping the relationship subscriber/provider intact.

Signaling bundling support—The system supports bundling of background data signaling over a network-specified time window, greatly reducing the transient channel allocation on the RNC and optimizing the battery life on mobile device.

Connectivity transaction—The system supports a periodic location beacon system that informs the server of the client's location. The server responds with a list of reachable networks at the location, thereby avoiding battery-intensive background scanning on the client host.

Analytics and usage statistics—The system provides the ability to report user-centric analytics and metrics for coverage and connectivity to the server host, thereby allowing mobile operators to use multi-dimensional intelligence to improve the mobile broadband experience and to increase revenue from the mobile broadband services.

By way of example only and without loss of generality, the following illustrative scenarios demonstrate the applicability of the system in real-world conditions, according to embodiments of the invention:

Scenario #1: A cellular subscriber enters a Wi-Fi zone in a coffee shop where the Wi-Fi network is not operated by the cellular provider. The subscriber is running a real-time entertainment application on the device streaming video from an Internet website not operated by the cellular provider. Before entering the Wi-Fi zone, the application was using the 3G services from the operator to stream traffic. Upon detecting a new radio event, the client communicates with the server deployed in the carrier's network and reports its location, availability of one or more Wi-Fi networks and their reported performance, the applications running on the devices and their QoS requirements. The server responds with instructions to offload all data traffic to the Wi-Fi network. The client seamlessly offloads the traffic to the local Wi-Fi network, preserving the ongoing network sessions and directly to the Internet server (e.g., by migrating the connection endpoint locally), thus completely bypassing the operator's core network. The 3G radio is put in a dormant mode, preserving the battery on the device. All the 3G signaling and cellular-based service (e.g., SMS/MMS) are still funneled through the carriers' network core. After some time, as the subscriber leaves the Wi-Fi zone, the client automatically reactivates the data session on the 3G network and for a short period of time, the traffic is split among the two active data connections, until the Wi-Fi connection drops and is entirely removed from the network aggregation.

Scenario #2: Assume a scenario similar to scenario #1 above, but the application is a premium service distributed by the operator (e.g., a MobileTV application). Many paid applications distributed by service providers rely on the inherent built-in security mechanisms provided by the cellular service to restrict unauthorized use of the application. Current off-loading solutions would not work in this instance because the entire application is inherently tied to the cellular network it needs to communicate with in order to operate. In contrast, embodiments of the invention preferably enable the client to peer into the traffic stream and dispatch the security traffic over the 3G connection and retrieve the video frames over the Wi-Fi network, concurrently and simultaneously, removing a large portion of the traffic off the carrier's core network while keeping the application secure and the relationship with the subscriber intact.

Scenario #3: Assume a scenario similar to scenario 1 above with a Wi-Fi network operated by a roaming partner with which the operator has established a peering agreement. The subscriber is still using the premium streaming application of scenario 2. Upon detecting the Wi-Fi network, the client updates the server via TPP signaling. The server responds with the security code to connect to the Wi-Fi network and instructs the client to offload all traffic to the 3G network (including all cellular signaling). Since the cellular operator has a peering agreement with the Wi-Fi operator, all 3G signaling is encapsulated and uses direct tunneling (e.g., I-HSPA) to backhaul it to the carrier's core network while all Internet-bound data is routed directly to it. This scenario is especially appealing when subscribers are roaming outside the primary network and greatly reduces roaming cost by bypassing the core networks of roaming partners.

IV. Multiplexing Network Connections for Efficient, Secure and Reliable Mobile, Hybrid Peer-to-peer Network With the ever-increasing demand for connectivity, wireless communication has gained rapid acceptance. The use of mobile devices, such as, for example, laptops and smartphones, has become prominent in daily life and a vision for nomadic and ubiquitous computing has spurred innovation. To date, most wireless technologies are infrastructure-based; i.e., they rely on the support of base stations or access points. However, these technologies are not well-suited in some situations such as military operations, search-and-rescue operations and the like, where access to infrastructure may be limited or entirely unavailable. Yet, these operations require rapidly deployable communications with reliable, efficient and dynamic networking.

Mobile peer-to-peer networks (sometimes referred to as mobile ad hoc networks or MANETS) have been helpful in bridging that gap. Peer-to-peer networks are dynamic, infrastructure-less networks in which participating nodes are required to collaborate with their peers in order to support the formation of the network as well as its operation. Although these types of networks have gained traction in recent years, they are yet to be deployed on a larger scale, due at least in part to the fact that none of the proposed architectures and protocols to date sufficiently satisfies the requirements for wider acceptance (e.g., reliability, efficiency and security).

Security is a challenge for mobile peer-to-peer networks. As an open and collaborative environment, nodes need to cooperate with their peers in supporting the network functionality. Consequently, in practice any node can maliciously or selfishly disrupt or deny communication to other nodes. Heavy security schemes relying on strong cryptography have been used to provide such security; however, such schemes severely impact network performance and are highly complex, thereby adding substantial cost and overhead.

Reliability is also critical to the wide adoption of mobile peer-to-peer networks and is usually defined as the guarantee for data delivery in the network. Due to the nature of the wireless medium, node and link failures are likely to occur. For example, nodes may need to communicate over harsh fading channels, thus enduring periods of intermittent failures (resulting in packet losses) and even total loss of connectivity. Such a harsh environment does not provide adequate guarantees of reliability demanded for wider acceptance.

Two systems are disclosed herein which address the above-noted problems inherent in conventional systems and methodologies; namely, a self-adapting scheme for robust and assisted mobile peer-to-peer networks, and a multiplexing scheme for hybrid peer-to-peer networks. It is to be appreciated, however, that the invention is not limited to the specific systems and methods described herein. Rather, techniques of the invention may be expanded and modified as will become apparent to those skilled in art given the teachings herein, and still remain within the scope of the present invention.

(1) Self-adapting System for Robust and Assisted Mobile Peer-to-Peer Networks

A system that aims at providing enhanced wireless communication security and reliability of mobile peer-to-peer networks without compromising on efficiency. This system is adapted to address challenges in traditional peer-to-peer networks, such as the lack of centralized control and monitoring, while not limiting their functionality or advantages, such as ease and speed of deployment.

An exemplary system according to embodiments of the present invention preferably relies on one or more of the following components:

Assisted Mobile Peer-To-Peer Network (AMPN)—is an architecture that integrates an out-of-band network (e.g., a cellular network) to support and optimize the operation of the peer-to-peer network. An agent, called Foreign Agent (FA), is deployed in the supporting network to monitor and collect information about the peer-to-peer network by means of feedback mechanisms. The FA agent communicates with the mobile nodes in the peer-to-peer network via an out-of-band radio channel, thereby avoiding network disruption or communication overhead. The mobile nodes adapt their routing strategies and behaviors based on feedback communicated by the FA agent to optimize security and reliability. Note, that a primary role of the external network is to provide privileged access to the FA agent, but the external network could also be used to provide backbone access or offload traffic.

AH-MNTP (Ad Hoc Multi-Network Protocol)—an augmented version of MNTP that supports peer-to-peer communication. It is also designed to support communication with the FA agent and provides for adaptive data transmission. AH-MNTP is a flexible protocol, allowing a mobile node to securely discover multiple node-disjoint paths to a destination, eventually using these paths to maximize security, reliability and efficiency in the network. AH-MNTP allows a node to selectively adapt its routing strategy and data transmission behavior based, at least in part, on feedback from the FA agent. The default fallback position in case communication between a node and the FA is disrupted is to maximize security. AH-MNTP preferably integrates a modified version of an Ad hoc On-demand Distance Vector (AODV) protocol for route discovery and management. The modifications to AODV include the support multi-path node-disjoint route discovery, secure routing as well as mechanisms to support MTNP as the transport protocol.

Figure 7:
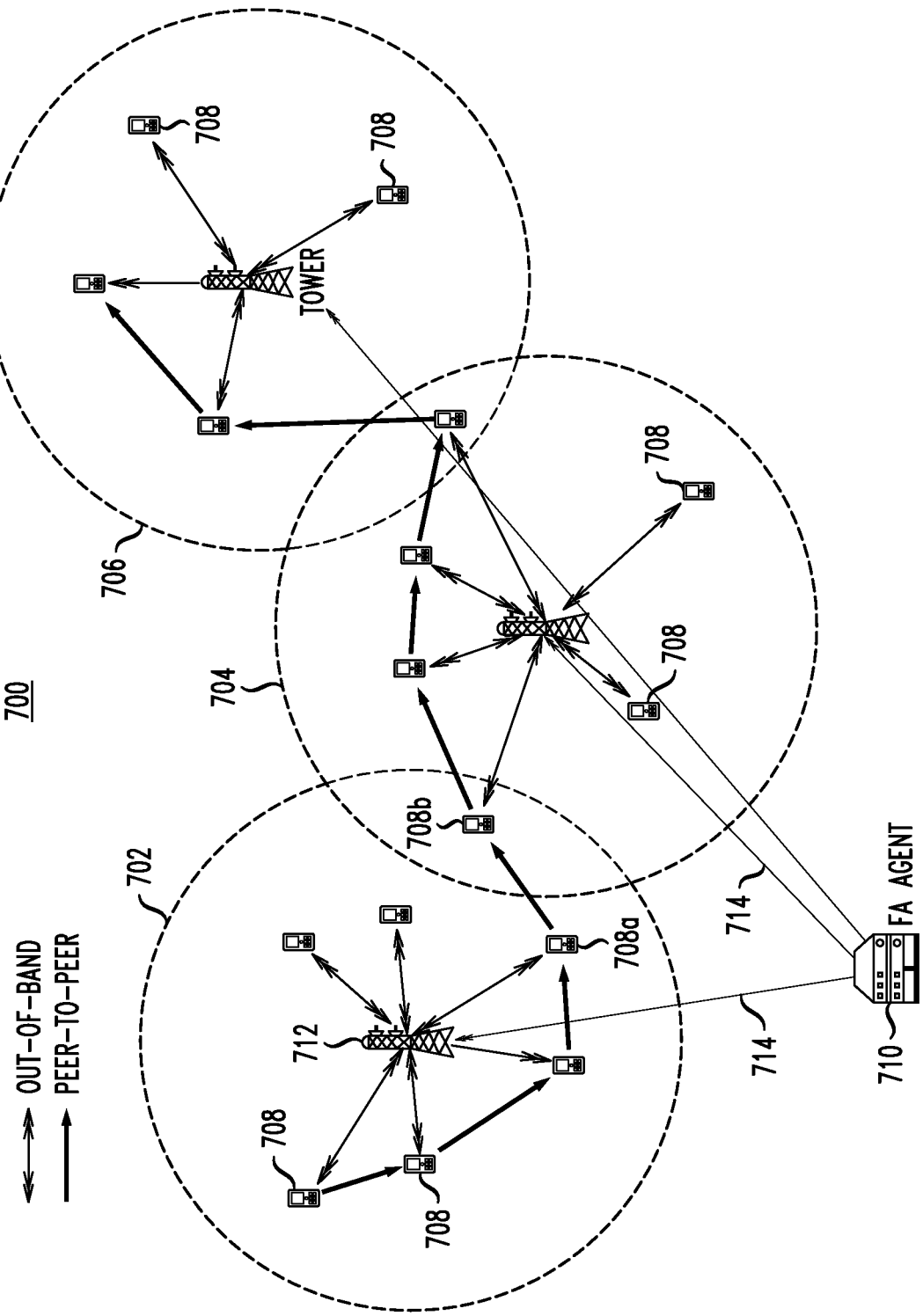
FIG. 7 illustrates an exemplary assisted mobile peer-to-peer network, according to an embodiment of the invention.

FIG. 7 illustrates an exemplary assisted mobile peer-to-peer network 700, according to an embodiment of the invention. Network 700 includes a plurality of individual cellular networks 702, 704, 706, each cellular network supporting a plurality of corresponding mobile devices 708. At least a portion of a given cellular network may have a coverage area associated therewith (e.g., designated by dotted boundary lines) which overlaps at least a portion of one or more other cellular network coverage areas, as shown. At least a subset of the mobile devices 708 may establish a per-to-peer network (e.g., ad hoc network), with each mobile device forming a node in the peer-to-peer network. As apparent from FIG. 7, devices outside of a given cellular network may communicate with one another as part of the peer-to-peer network. For example, mobile device 708a in cellular network 702 and mobile device 708b in cellular network 704 may be part of the same peer-to-peer network.

As stated above, an FA agent 710 communicates with the mobile devices 708 via one or more out-of-band radio channels established between a tower 712 (base station) corresponding to a given cellular network 702 and one or more mobile devices 708 in the cellular network. The FA agent 710 is preferably configured as a watchdog agent deployed in the out-of-band network. Participating nodes in the peer-to-peer network communicate with the FA agent 710 via one or more out-of-band channels 714. The FA agent 710 is operative as a centralized server and maintains global information about the entire peer-to-peer network.

In an illustrative embodiment, the FA agent 710 is configured for collecting information, providing routing assistance and/or supporting security in the peer-to-peer network. Collecting information may include, for example, soliciting feedback from both sending and receiving nodes (e.g., mobile devices 708) after successful or unsuccessful data transmission. Furthermore, or alternatively, such information collection process may include compiling statistics or other information, such as, for example, status on the reliability of nodes or the lifetime of a particular route (where the lifetime of a given route may be defined herein as an elapsed time from when a route was originally established to the time it is first marked as failed). Collected statistics may be weighted over time to account for network dynamics (e.g., network connectivity, node density, number of intruders, etc.). The FA agent 710 may provide route assistance, which may include maintaining "blacklists" of nodes that must not be included in any computed routes. Furthermore, by providing feedback to the nodes (e.g., mobile devices 708), the nodes will individually be able to assign trust levels to route candidates upon completion of a route discovery process. The trust level assigned to individual nodes on a given route can be used to determine the overall trust level of the particular route. The trust level of a given node may be determined by its past performance, or other prescribed characteristics (e.g., length of time in service, etc.).

Security measures provided by the FA agent 710 preferably include encrypted information exchanges with the mobile devices/nodes 708. Respective symmetric keys are exchanged as part of an authentication process when a node is first joining the peer-to-peer network (which can rely on the built-in authentication provided by the out-of-band network, such as a cellular network). The FA agent may also be responsible for key distribution and clock synchronization if required by the security schemes used in the peer-to-peer network.

AH-MNTP is an augmented version of MNTP that integrates a modified version of the AODV routing protocol for route discovery and management, called a Route Discovery (RD) module and a Route Analyzer (RA) module. The AODV protocol, as defined by RFC3561 (See, e.g., C. Perkins, et al., "Request for Comments: 3561, Ad hoc On-Demand Distance Vector (AODV) Routing," Network Working Group, July 2003, the disclosure of which is incorporated herein by reference in its entirety), defines route discovery and data forwarding. According to embodiments of the invention, the route discovery functionality is preferably modified as described below to incorporate features of the invention.

Specifically, the RD module is adapted to perform a discovery of available candidates to define a set of available paths between a source node and a destination node. The set of paths discovered is then used by the RA module which is operative to determine if they are suitable to MNTP. The discovery process is preferably modeled after AODVM to allow node-disjoint route discovery and determining nodal connectivity for each route discovered, although alternative discovery techniques are similarly contemplated by the invention. Candidate paths, as well as a main path, are preferably tracked during route discovery, for example, by requiring intermediate nodes to construct a RREQ table, or alternative mechanism, for duplicate RREQ instead of discarding them as specified in the AODV standard, according to embodiments of the invention.

Knowledge of the actual nodal connectivity in the RD process allows a path-scheduling algorithm in AH-MNTP to optimize reliability and security of the data transmission based, at least in part, on feedback from the FA agent. Moreover, since no routing decision is left to the corresponding nodes, the sender and receiver can explicitly correlate the successful and/or failed transmission to the corresponding routes. Non-operational or potentially compromised routes are reported back to the FA agent. Nodal connectivity is determined using a modified RREQ-ACK packet to record the unique IDs of all intermediary nodes. In the AODV protocol as defined by RFC3561, the RREQ-ACK only collects the unique IDs of the next hop. According to an aspect of the invention, RREQ-ACK is preferably modified such that all the unique IDs of all intermediary nodes along a given path are contained in the RREQ-ACK. Upon reception of these packets, the sender is able to reconstruct the discovered path and forward it to the FA agent for analysis.

The RA module correlates feedback from the FA agent with RD route information in order to determine a set of optimal routes and a multiplexing data transmission strategy (e.g., dispersed, duplicated, or multiplexed). The RA module accepts a route as valid if: (a) it is node-disjoint with active routes; (b) none of the nodes involved are blacklisted; and (c) it has not been reported as failing within a prescribed time window. Routes can also be associated with a trusted node (e.g., as a function of past behavior) as recorded by the FA agent.

To determine an optimal multiplexing strategy for a given application, the RA module preferably always favors security and reliability over performance, especially during a bootstrap phase; in that respect, packet duplication and dispersion are the most secure and reliable multiplexing strategies. Once the FA agent can confirm the trustworthiness of the certain paths, the RA module preferably controls the multiplexing to take advantage of the multiple paths to a destination in order to optimize performance.

When the interaction with the FA agent does not allow an assessment of a route, the RA module will preferably assume that it is operating in an adverse environment. The feedback mechanism between the system and the FA agent preferably operates at two levels. Specifically, according to an embodiment of the invention, communication with the RD module is unidirectional; route updates are sent to the FA agent upon discovery. Communication between the RA module and the FA agent is preferably bidirectional, whereby the RA updates the FA agent upon transmission of data to a receiver. In other embodiments, a unidirectional communication with the RA module may be employed, although certain features of the methodology may be unavailable in this case. A successful transmission will preferably increase the rating and trustworthiness of all the nodes in the route while a failed transmission will decrease the rating for the route and all intermediate nodes in at least the failed portion of the route. Based on data collected by all participating nodes, the FA agent is able to continuously (i.e., dynamically) refine the quality and trustworthiness of all participating nodes in the peer-to-peer network.

(2) Mobile Hybrid Ad Hoc Network Multiplexing

A system that provides data path aggregation in mobile hybrid peer-to-peer networks will be described in further detail herein below. Mobile hybrid peer-to-peer networks may be defined herein as a type of network comprised of multi-homed devices that support both peer-to-peer communications and infrastructure-based communications concurrently. A simple example of such a device is a smartphone equipped with Wi-Fi and/or Bluetooth for peer-to-peer communication and a 3G interface for infrastructure-based communication. Of course, one could easily conceive of a device with many more network interfaces, such as a Bluetooth and/or UWB used for peer-to-peer communication and Wi-Fi, 3G and/or 4G cellular used for infrastructure-based communication. In such a system, nodes can communicate directly with each other over the mobile peer-to-peer network and with external infrastructure networks.

Nodes can also preferably advertise their infrastructure network capabilities to each other Infrastructure networks capabilities information may include, for example, network interface type, gateway and routing information, QoS information, pricing, location information, in addition to local information such as current load, network utilization, battery level, among other information. This mechanism allows extending the communication and routing of traffic outside the mobile peer-to-peer network.

FIG. 8 illustrates an exemplary four-node hybrid peer-to-peer network 800, according to an embodiment of the invention. As shown in the figure, network 800 includes a first node (A) 802, a second node (B) 804, a third node (C) 806 and a fourth node (D) 808. Each of the nodes comprises a mobile device.

After a discovery and mutual authentication phase, nodes A, B, C and D form a mobile peer-to-peer network and preferably exchange route updates to reflect their mobility. They may also advertise network capabilities information, allowing information to be routed into and out of the local peer-to-peer network. For instance, with reference to FIG. 8, nodes A and B are out of reach of any infrastructure network, while nodes C and D have advertised their ability to attach to a Wi-Fi network and a 3G cellular network for node C and a 3G cellular network for node D.

When routing traffic bound outside of the local peer-to-peer network, node A for instance, has the option to use node C or node D as a gateway to outside networks. If node C is selected, data traffic 810 will be forwarded to node B, which will then forward said traffic to node C on behalf of node A. Node C will then route the traffic 810 to the Wi-Fi network or the 3G cellular network based on its advertised network capabilities information. Alternatively, node A could have chosen node D as the final gateway, in which, node C would have acted as a forwarder (as in the case of node B) and not as a gateway. The sender (node A) can choose the gateway based on a number of factors, including route freshness (exchanged during periodic route updates between peer-to-peer nodes), signal quality and network utilization (for the infrastructure network interface), policies (e.g., routing preferences, price, security consideration, etc.), among other factors.

Furthermore, since each node 802, 804, 806, 808 forming the mobile peer-to-peer network has multi-path aggregation capabilities, they can aggregate remote connections in addition to local connections. Remote connections may be defined herein as network connections attached to peer nodes, reachable over a peer-to-peer network. A sender node can request that its traffic be routed over multiple remote connections in a load-balancing mode (e.g., connections are not split but mapped to a specific remote interface(s)) or in an aggregated mode (e.g., connections are split and transmitted concurrently over multiple remote interfaces).

The aggregated mode preferably requires an aggregation server, or alternative controller, located outside of the peerto-peer network and reachable by the nodes used for the aggregation through their remote connections. Sending and receiving nodes will preferably advertise their extended multi-homed capabilities to the server, which include their local network interfaces and the remote interfaces of peer nodes in reach. Periodic updates to the server are made as peer-to-peer nodes receive route updates from other peer nodes in the peer-to-peer network. This mechanism allows nodes to use different local and remote connections for uplink and downlink, but more importantly minimizes loss and retransmissions as peer-to-peer routes are breaking or expiring, a common and expected behavior of mobile (wireless) peer-to-peer networks The aggregation scheduling strategy can be computed by the sender based at least in part on prescribed (e.g., agreed upon a priori) QoS guarantees and traffic priority, policies (e.g., predefined or disseminated by the aggregation server), or a best effort service whereby peer nodes apply a store-and-forward strategy, transmitting a portion of the traffic (e.g., based on current or expected network load, power level, etc.) and forwarding the remainder of the traffic to other participating nodes.

Figure 9B:
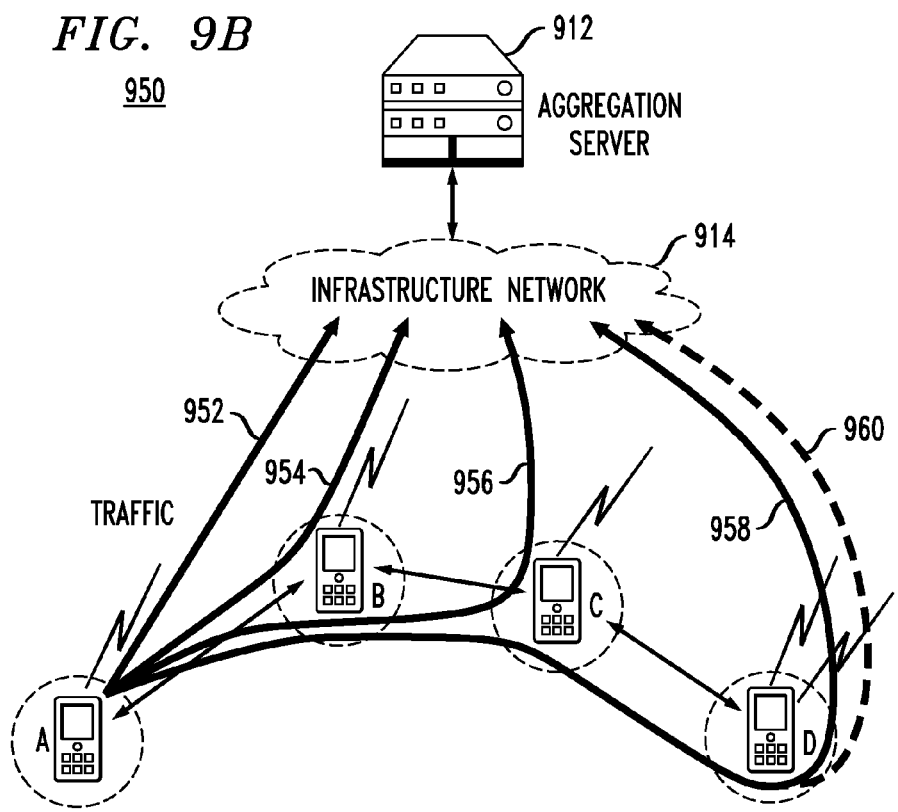

With reference to FIGS. 9A and 9B, consider the following illustrative scenario whereby nodes A, B and C have one remote connection and node D has two remote connections. Node A initiates a download of a file located on an Internet server. Route discovery has been achieved and periodic route updates are sent between peer nodes. An aggregation server 912, and corresponding infrastructure network 914 in communication with the aggregation server, preferably receives the periodic route updates and other status information relating to the nodes for managing the peer-to-peer network. Nodes B and C have agreed to route node A's traffic on their remote interfaces, while node D has agreed to route traffic on only one of its remote interfaces, with the other remote interface being reserved for high-priority traffic. Node A is able to download the file through an aggregation of its own local connection 952, and three additional remote connections 954, 956 and 958, from nodes B, C and D, respectively, to thereby increase bandwidth, as shown in FIG. 9B. Once the download of the file is finished, if a high-priority file needs to be transmitted, the second remote connection 960 associated with node D is seamlessly added to the aggregation.

Figure 10A:
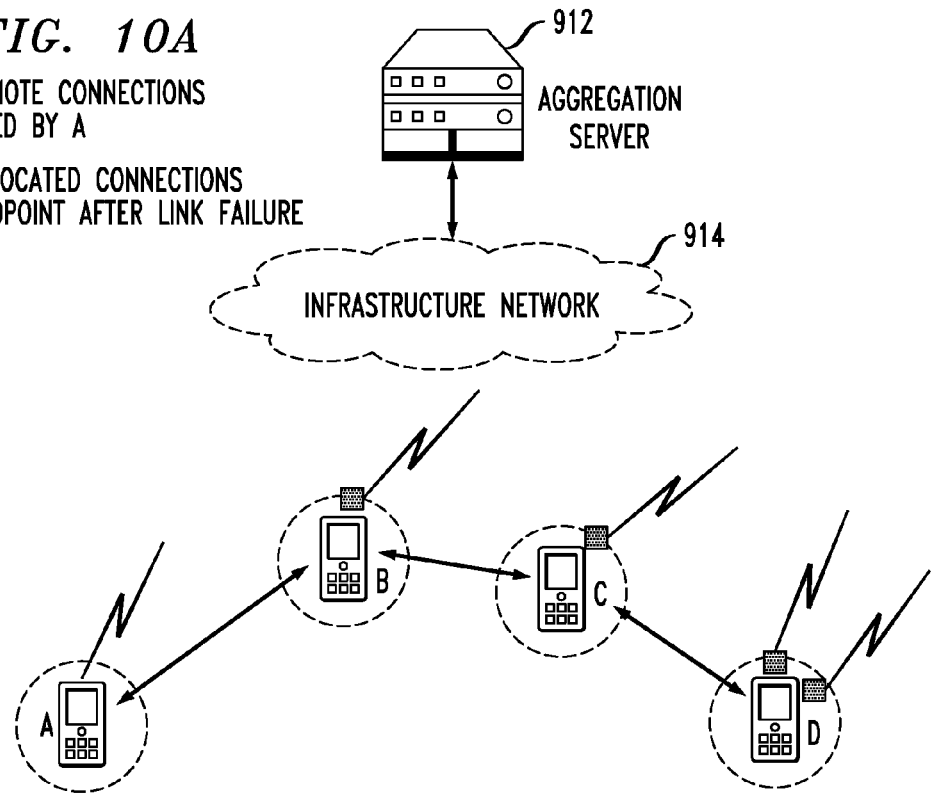
FIGS. 10A and 10B illustrate an exemplary connection relocation methodology in a hybrid peer-to-peer network, according to an embodiment of the invention.
Figure 10B:
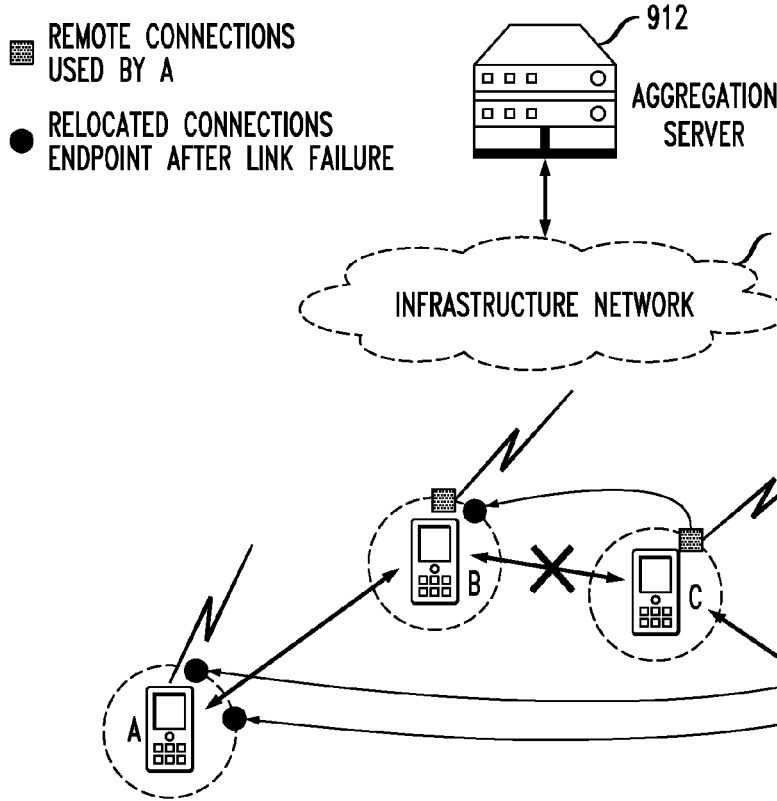

With reference now to FIGS. 10A and 10B, consider an illustrative scenario similar to the one described above in conjunction with FIGS. 9A and 9B, but during the download, node A receives an update from node B that node C is no longer reachable from node B (i.e., the connection between nodes B and C has failed). Node A immediately emits an update to the aggregation server 912 that it is no longer reachable through nodes C and D. Similarly, upon detecting the link break, node C transmits an update to the aggregation server 912 that its remote connection is no longer valid for node A. Upon receiving the first of the updates, the aggregation server 912 immediately brokers a relocation of connection endpoints (e.g., achieved through socket migration) from nodes C and D to nodes A and B, allowing the in-flight traffic to be delivered to node A, thereby minimizing the amount of data in need of retransmission.

The relocation of connection endpoints may be subject to predetermined policies residing on the server 912 or through a negotiation process with each of the participating nodes, brokered by the server, or through some other mechanism. By default, connection endpoints are relocated to node A if its local connection is reachable by the server, or otherwise to the closest node (e.g., "closeness" being defined by number of hops) to node A; node B in this example.

An exemplary applicability of the system to real-world scenarios are described below, according to illustrative embodiments of the invention.

Scenario #1: Assume a disaster-response scenario where first responders that are part of a recovery mission are equipped with Wi-Fi enabled PC tablets for situational analysis as well 3G cellular and Wi-Fi capable handset devices, in addition to a few strategically deployed command and control vehicles equipped with high-speed wireless connection such as satellite or microwave. Furthermore, during the disaster all infrastructure has been destroyed in a 10-miles radius blackout zone. As first responders perform their duties, they are able to communicate with each other using the peer-to-peer network established using the Wi-Fi network interface. One could imagine a team leader disseminating orders, audio and/or video files from a command and control vehicle through the peer-to-peer network and aggregating the satellite and 3G cellular connections of first responders in the coverage zone to increase the available bandwidth.

Similarly, data traffic from first responders inside the blackout zone is relayed through peers and routed through their respective remote connections, if available, or through the satellite connection of the command and control vehicle. As service providers are restoring service in part of the blackout zone, peer devices are detecting and advertising (updating) their new capabilities, allowing resources to be expanded dynamically without user intervention.

To ensure proper segregation of information, one could envision a policy where all information from team members is funneled through the team leader's system (hierarchical behavior). The default policy becomes: all communications from first responders is propagated to the command and control vehicle using the peer-to-peer network which in turn aggregates the active remove connections on teammates' devices, maximizing the available bandwidth. In such a scenario, the supporting server would ideally be deployed at HQ or central command.

Another application in this scenario would be to aggregate multiple node-disjoint routes to retrieve shared resources available on peer devices. For instance, a first responder could have large maps stored on one of the PC tablets and another first responder at the other end of the peer-to-peer network could retrieve it locally, aggregating multiple routes available between him and his peer where the maps are stored, ensuring the best performance.

Scenario #2: Assume a scenario where a group of Wi-Fi and 3G capable smartphone users are at a venue (e.g., concert, cafe, shopping center, etc.). On average, only a portion of the users are using their respective Internet connections at the same time. Users can form a peer-to-peer network and use the 3G connection of other users with dormant radios to increase the network performance of an application(s) running on their devices. Similarly, should a service operators' base-station be overloaded or unreachable, or coverage be nonexistent at a specific location, users of that service would be able to remain connected by using the connection of nearby users, in a completely transparent fashion.

Scenario #3: Consider a scenario taking place on a highway with cars equipped with 3G cellular and Wi-Fi capable terminals. Cars are forming a vehicular peer-to-peer network using the Wi-Fi interface and maintain connectivity with each other dynamically; peer cars are added and removed from the peer-to-peer network as they travel to their respective destinations. Assume that all the cars are using an Internet-based navigation system that retrieves high definition mapping information in real-time. Instead of having all cars download the entire map for their location, map titles already downloaded by peer cars could be exchanged rapidly between all the cars in the vicinity using one or more routes available in the peer-to-peer network, thereby greatly improving performance and reducing the load on the 3G cellular network.

A practical implementation of this system could be achieved by deploying a TPA (as described above) augmented with AH-MNTP capabilities (described above) on each of the peer devices. The TPP protocol could be used for out-of-band signaling. Resource advertisements could be implemented with an XMPP-based layer, using multicast for nodes belonging to a peer-to-peer network.

As will be appreciated by those skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 11:
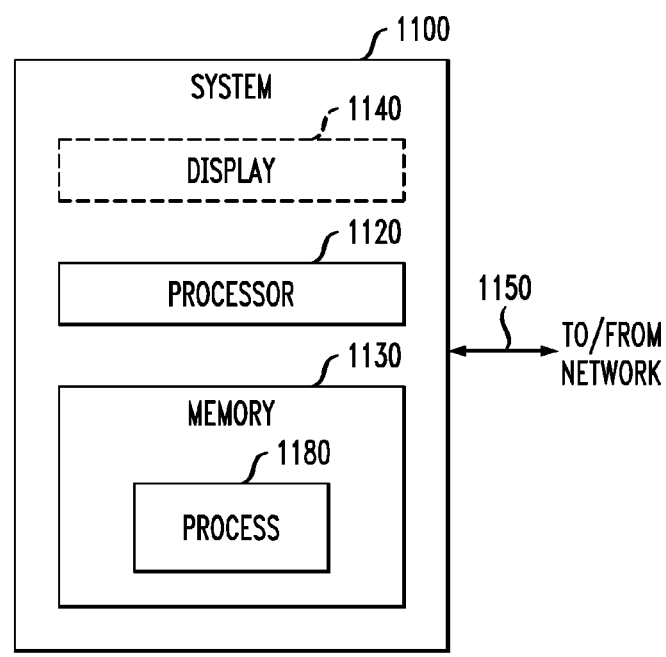
FIG. 11 is an exemplary system in which one or more aspects of the invention may be implemented, according to an embodiment of the invention.

One or more embodiments can make use of software running on a general purpose computer, workstation or alternative electronic system. With reference to FIG. 11, such an implementation might employ, for example, a processor 1120, a memory 1130, and an input/output interface 1140 formed, for example, by a display and a keyboard (not explicitly shown), or other peripheral components. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, display). The processor 1120, memory 1130, and input/output interface can be interconnected, for example, via a bus as part of a data processing unit 1100. Suitable interconnections, for example via network connection 1150, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies (processes) 1180 of the invention, as described herein, may be stored in one or more of the associated memory devices 1130 (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1120 coupled directly or indirectly to memory elements 1130 through a system bus or alternative connection means. The memory elements can include local memory employed during actual implementation of the program code, bulk storage, and cache memories which provide temporary storage of at least some program code in order to reduce the number of times code must be retrieved from bulk storage during implementation.

Input/output or I/O devices 1140 (including but not limited to keyboards, displays, pointing devices, and the like) can be coupled to the system either directly (such as via a bus) or through intervening I/O controllers (omitted for clarity).

Network adapters such as a network interface may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1100 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to illustrations and/or block diagrams of methods, apparatus (systems) and computer program products according to embodiments of the invention. It will be understood that each block of the flowchart illustrations and/or block diagrams, and combinations of blocks in the illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the illustrations and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the illustrations and/or block diagram block or blocks described herein.

The flowchart and block diagrams in the Figures illustrate the architecture, functionality, and operation of possible implementations of systems, methods and computer program products according to various embodiments of the present invention. In this regard, each block in the illustrations or block diagrams may represent a module, segment, or portion of code, which comprises one or more executable instructions for implementing the specified logical function(s). It should be noted that each block of the block diagrams and/or illustrations, and combinations of blocks in the block diagrams and/or illustrations, can be implemented by special purpose hardware-based systems that perform the specified functions or acts, or combinations of special purpose hardware and computer instructions.

It should be further noted that any of the methods described herein can include an additional step of providing a system comprising distinct software modules embodied on a computer readable storage medium; the modules can include, for example, any or all of the elements depicted in the block diagrams and/or described herein; by way of example and not limitation, a data acquisition module, an analysis module, and a data processing module. The method steps can then be carried out using the distinct software modules and/or sub-modules of the system, as described above, executing on one or more hardware processors 1120. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for forming an optimized communication connection providing enhanced performance of at least one application utilizing the communication connection, the optimized communication connection comprising a plurality of individual communication networks, the method comprising the steps of:
   obtaining a set of performance requirements corresponding to the at least one application utilizing the communication connection;
   obtaining capacity information for each of a plurality of available channels associated with the respective plurality of individual communication networks;
   applying at least one policy-based management criteria to the available channels for controlling one or more aspects of the available channels;
   dynamically aggregating the plurality of individual communication networks to form the optimized communication connection, the communication connection leveraging one or more features and capabilities of at least a subset of the plurality of communication networks; and
   controlling real-time traffic scheduling across at least a subset of the plurality of available channels so as to adapt the communication connection to changes in at least one of network conditions and policy-based management criteria;
   wherein controlling real-time traffic scheduling comprises estimating available bandwidth on network paths, said estimating available bandwidth comprising:
     sending a train of User Datagram Protocol (UDP) probes to dynamically estimate available bandwidth along each of a given end-to-end network path for network paths that have been inactive for a prescribed period of time; and estimating available bandwidth on network paths using passive low-pass filtering for active network paths.

2. The method of claim 1, wherein the communication connection, by aggregating and leveraging at least a subset of features and capabilities of the plurality of individual communication networks, has characteristics associated therewith that are superior to any one of the individual communication networks.

3. The method of claim 1, wherein the step of obtaining a set of performance requirements corresponding to the at least one application comprises performing real-time profiling of the at least one application.

4. The method of claim 1, wherein the step of applying at least one policy-based management criteria to the available channels is controlled locally.

5. The method of claim 1, wherein the step of applying at least one policy-based management criteria to the available channels is network controlled.

6. The method of claim 1, wherein the step of obtaining capacity information for each of the plurality of available channels comprises performing at least one of passive monitoring, active monitoring and real-time data collection.

7. The method of claim 6, wherein passive monitoring comprises monitoring traffic performance on the plurality of available channels in real-time.

8. The method of claim 6, wherein active monitoring comprises periodically sending one or active performance probes.

9. The method of claim 1, wherein the step of controlling real-time traffic scheduling across the plurality of available channels comprises estimating at least one performance characteristic of each of the plurality of channels to thereby optimize concurrent transmission of data traffic.

10. The method of claim 9, wherein the at least one performance characteristic comprises at least one of bandwidth, round trip delay time (RTT) and jitter associated with each of the plurality of channels.

11. The method of claim 1, wherein the step of dynamically aggregating the plurality of individual communication networks to form the optimized communication connection is performed using a dynamic multi-path network protocol.

12. The method of claim 11, wherein the dynamic multi-path network protocol comprises a multi-network transport protocol (MNTP).

13. The method of claim 1, wherein the step of controlling real-time traffic scheduling across at least the subset of the plurality of available channels further comprises:

reconfiguring real-time traffic scheduling across at least the subset of the plurality of available channels as a function of estimated available bandwidth of the network paths.

14. The method of claim 1, wherein the step of sending the train of UDP probes comprises sending an exponentially-spaced train of UDP probes having an exponential packet flight pattern.

15. The method of claim 1, wherein the step of controlling real-time traffic scheduling comprises reconfiguring real-time traffic scheduling across at least the subset of the plurality of available channels as a function of at least one of available window size, latency estimation, bandwidth estimation and in-flight and queue traffic computation corresponding to at least the subset of the plurality of available channels.

16. The method of claim 1, wherein the step of controlling real-time traffic scheduling comprises reconfiguring real-time traffic scheduling across at least the subset of the plurality of available channels as a function of one or more requirements of the at least one application utilizing the communication connection.

17. The method of claim 16, wherein the step of reconfiguring real-time traffic scheduling comprises at least one of mirroring traffic on a subset of the plurality of available channels, and mapping at least a portion of prescribed traffic onto at least one specified network path.

18. The method of claim 1, further comprising the step of maintaining at least one virtual queue per destination with a sender's retransmission queue and applying a retransmission procedure on a per-destination basis without affecting an operation of the sender so as to enable the sender to adapt a size of a congestion window maintained by the sender to thereby reduce a number of unnecessary packet retransmissions when packet reordering is performed at the destination.

19. The method of claim 1, further comprising the steps of:

obtaining transmission destination information for determining in-order delivery of data by a sender to a corresponding destination; and generating selective acknowledgments to the sender indicative of receipt of the data by the destination as a function of the transmission destination information.

20. The method of claim 19, wherein the step of generating selective acknowledgments comprises delaying all acknowledgments to the sender irrespective of an order in which data is received.

21. A method for forming an optimized communication connection providing enhanced performance of at least one application utilizing the communication connection, the optimized communication connection comprising a plurality of individual communication networks, the method comprising the steps of:

obtaining a set of performance requirements corresponding to the at least one application utilizing the communication connection;

obtaining capacity information for each of a plurality of available channels associated with the respective plurality of individual communication networks;

applying at least one policy-based management criteria to the available channels for controlling one or more aspects of the available channels;

dynamically aggregating the plurality of individual communication networks to form the optimized communication connection, the communication connection leveraging one or more features and capabilities of at least a subset of the plurality of communication networks;

controlling real-time traffic scheduling across at least a subset of the plurality of available channels so as to adapt the communication connection to changes in at least one of network conditions and policy-based management criteria; and computing at least one of: a reordering density map (RDM) comprising a distribution of displacements of received packets from their respective original temporal positions, normalized with respect to a total number of packets received; and a displacement frequency map (DFM) comprising a normalized histogram indicative of an ordering of received packets which, when released from a buffer, minimizes out-of-order delivery of packets.

22. The method of claim 21, wherein an occupancy of each packet in the buffer corresponding to the DFM is indicative of a measure of reordering required to correct out-of-order delivery of packets.

23. The method of claim 21, wherein the step of controlling real-time traffic scheduling across at least the subset of the plurality of available channels is performed as a function of at least one of the RDM and the DFM.

24. A method for forming an optimized communication connection providing enhanced performance of at least one application utilizing the communication connection, the optimized communication connection comprising a plurality of individual communication networks, the method comprising the steps of:
  obtaining a set of performance requirements corresponding to the at least one application utilizing the communication connection;
  obtaining capacity information for each of a plurality of available channels associated with the respective plurality of individual communication networks;
  applying at least one policy-based management criteria to the available channels for controlling one or more aspects of the available channels;
  dynamically aggregating the plurality of individual communication networks to form the optimized communication connection, the communication connection leveraging one or more features and capabilities of at least a subset of the plurality of communication networks;
  controlling real-time traffic scheduling across at least a subset of the plurality of available channels so as to adapt the communication connection to changes in at least one of network conditions and policy-based management criteria;
  computing at least one of: a reordering density map (RDM) comprising a distribution of displacements of received packets from their respective original temporal positions, normalized with respect to a total number of packets received; and a displacement frequency map (DFM) comprising a normalized histogram indicative of an ordering of received packets which, when released from a buffer, minimizes out-of-order delivery of packets; and
  controlling, on a per-message basis, a persistence of transport in attempting to send a message to an intended receiver, indicative of when the message has expired, as a function of at least one criteria specified by the at least one application utilizing the communication connection.

25. The method of claim 24, wherein the step of controlling the persistence of transport comprises implementing at least one congestion algorithm operative to handle expired messages, and wherein the persistence of transport indicative of when a message has expired is adapted as a function of the at least one congestion algorithm.

26. The method of claim 24, further comprising sending a notification to a peer endpoint when at least one message has expired, the notification comprising a sequence number corresponding to the at least one expired message.

27. The method of claim 24, further comprising establishing a plurality of transport streams within the optimized communication connection, each of at least a subset of the streams being configured to have different performance characteristics.

28. The method of claim 27, wherein the step of controlling real-time traffic scheduling comprises applying a different scheduling scheme to each of at least the subset of the streams.

29. A method for forming an optimized communication connection providing enhanced performance of at least one application utilizing the communication connection, the optimized communication connection comprising a plurality of individual communication networks, the method comprising the steps of:
  obtaining a set of performance requirements corresponding to the at least one application utilizing the communication connection;
  obtaining capacity information for each of a plurality of available channels associated with the respective plurality of individual communication networks;
  applying at least one policy-based management criteria to the available channels for controlling one or more aspects of the available channels;
  dynamically aggregating the plurality of individual communication networks to form the optimized communication connection, the communication connection leveraging one or more features and capabilities of at least a subset of the plurality of communication networks;
  controlling real-time traffic scheduling across at least a subset of the plurality of available channels so as to adapt the communication connection to changes in at least one of network conditions and policy-based management criteria;
  computing at least one of: a reordering density map (RDM) comprising a distribution of displacements of received packets from their respective original temporal positions, normalized with respect to a total number of packets received; and a displacement frequency map (DFM) comprising a normalized histogram indicative of an ordering of received packets which, when released from a buffer, minimizes out-of-order delivery of packets; and
  establishing a plurality of transport streams within the optimized communication connection, each of at least a subset of the streams being configured to have different performance characteristics;
  wherein the step of controlling real-time traffic scheduling comprises applying a different message expiration criterion to each of at least the subset of the streams.

30. The method of claim 29, wherein the step of applying at least one policy-based management criteria to the available channels for controlling one or more aspects of the available channels comprises controlling one or more aspects of the available channels in real-time.

31. The method of claim 29, wherein the step of obtaining capacity information for each of a plurality of available channels comprises obtaining real-time capacity information for each of a plurality of available channels.

32. An apparatus for multiplexing a plurality of individual network connections to form an enhanced communication connection providing at least one of increased bandwidth, security, reliability and efficiency in a hybrid peer-to-peer network, the apparatus comprising:
  memory; and at least one processor connected with the memory; and
    a non-transitory persistent storage medium that contains instructions which, when loaded into said memory, configure said at least one processor:
    to obtain a set of performance requirements corresponding to at least one application utilizing the communication connection;
    to obtain capacity information for each of a plurality of available channels associated with the respective plurality of individual network connections;
    to apply at least one policy-based management criteria to the available channels for controlling one or more aspects of the available channels;
    to dynamically aggregate the plurality of individual network connections to form the enhanced communication connection, the communication connection leveraging one or more features and capabilities of at least a subset of the plurality of network connections;

to control real-time traffic scheduling across at least a subset of the plurality of available channels so as to adapt the communication connection to changes in at least one of network conditions and policy-based management criteria;

to compute at least one of: a reordering density map (RDM) comprising a distribution of displacements of received packets from their respective original temporal positions, normalized with respect to a total number of packets received; and a displacement frequency map (DFM) comprising a normalized histogram indicative of an ordering of received packets which, when released from a buffer, minimizes out-of-order delivery of packets; and to establish a plurality of transport streams within the enhanced communication connection, each of at least a subset of the streams being configured to have different performance characteristics;

wherein said control of real-time traffic scheduling comprises applying a different message expiration criterion to each of at least the subset of the streams.

33. The apparatus of claim 32, wherein the at least one processor is operative to aggregate the plurality of multiple access networks into the logical connection such that the logical connection integrates at least a portion of characteristics associated with the plurality of individual multiple access networks, whereby the logical connection has overall characteristics associated therewith that are superior to any one of the individual multiple access networks.

* * * * *